United States Patent
Nakaguro et al.

(10) Patent No.: US 8,162,099 B2
(45) Date of Patent: Apr. 24, 2012

(54) VEHICLE INTERIOR STRUCTURE

(75) Inventors: Takanobu Nakaguro, Toyota (JP); Toshihiro Tsuemoto, Toyota (JP); Atsushi Hiroshige, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 30 days.

(21) Appl. No.: 12/739,534

(22) PCT Filed: Oct. 17, 2008

(86) PCT No.: PCT/JP2008/068864
§ 371 (c)(1),
(2), (4) Date: Jul. 15, 2010

(87) PCT Pub. No.: WO2009/054323
PCT Pub. Date: Apr. 30, 2009

(65) Prior Publication Data
US 2010/0289301 A1 Nov. 18, 2010

(30) Foreign Application Priority Data
Oct. 23, 2007 (JP) .................................. 2007-274966

(51) Int. Cl.
*G10K 11/18* (2006.01)
*G10K 11/28* (2006.01)
*G10K 11/00* (2006.01)

(52) U.S. Cl. ......... 181/175; 181/287; 181/204; 296/214

(58) Field of Classification Search ............... 181/287, 181/204, 205, 295, 30, 296, 175, 176, 18, 181/141; 296/39.3, 214, 37.5, 37.7, 37.8; 701/49, 36; 381/71.4, 302, 86
See application file for complete search history.

(56) References Cited

U.S. PATENT DOCUMENTS

| | | | | |
|---|---|---|---|---|
| 1,120,858 A * | 12/1914 | Stallforth | ......................... | 181/30 |
| 5,031,220 A * | 7/1991 | Takagi et al. | ................... | 381/86 |
| 5,268,539 A * | 12/1993 | Ono | ............................... | 181/155 |
| 5,532,438 A * | 7/1996 | Brown | .......................... | 181/155 |
| 5,569,888 A * | 10/1996 | Kamani et al. | ................ | 187/317 |
| 5,719,945 A * | 2/1998 | Fuller et al. | .................. | 381/71.2 |

(Continued)

FOREIGN PATENT DOCUMENTS

JP    61 1515    1/1986

(Continued)

OTHER PUBLICATIONS

Office Action issued Dec. 29, 2011, in Korean Patent Application No. 10-2010-7011088, filed Oct. 17, 2008 (with English-language Translation), 7 pages.

*Primary Examiner* — Edgardo San Martin
(74) *Attorney, Agent, or Firm* — Oblon, Spivak, McClelland, Maier & Neustadt, L.L.P.

(57) ABSTRACT

A vehicle interior structure that may realize a more amenable vehicle interior space by making communication between occupants sitting on a pair of vehicle seats easier. The vehicle interior structure includes: a pair of vehicle seats; and a sound-reflecting communication unit for conveying a sound produced from occupants sitting, respectively, on the pair of vehicle seats to the other occupant, while reflecting and converging the sound. The sound-reflecting communication unit forms a concave shape along a virtual ellipse, focuses of which are respectively at positions of heads of the occupants.

21 Claims, 18 Drawing Sheets

U.S. PATENT DOCUMENTS

| | | | |
|---|---|---|---|
| 5,850,060 A | 12/1998 | Gerber et al. | |
| 6,343,129 B1 * | 1/2002 | Pelrine et al. | 381/191 |
| 6,463,156 B1 * | 10/2002 | Gaudriot et al. | 381/71.1 |
| 6,520,280 B2 | 2/2003 | Moskowitz | |
| 6,527,080 B2 | 3/2003 | Davies et al. | |
| 7,284,786 B2 * | 10/2007 | Browne et al. | 296/181.1 |
| 7,567,681 B2 * | 7/2009 | Pelrine et al. | 381/191 |
| 7,705,522 B2 * | 4/2010 | Gandhi | 310/328 |
| 2002/0066618 A1 | 6/2002 | Davies et al. | |
| 2002/0122561 A1 * | 9/2002 | Pelrine et al. | 381/191 |
| 2004/0197519 A1 * | 10/2004 | Elzey et al. | 428/68 |
| 2005/0201567 A1 * | 9/2005 | Browne et al. | 381/71.5 |
| 2006/0170243 A1 * | 8/2006 | Browne et al. | 296/146.9 |
| 2010/0150359 A1 * | 6/2010 | KnicKrehm et al. | 381/58 |
| 2010/0290659 A1 * | 11/2010 | Tagami et al. | 381/352 |
| 2011/0024225 A1 * | 2/2011 | Stephenson et al. | 181/30 |

FOREIGN PATENT DOCUMENTS

| | | |
|---|---|---|
| JP | 4 71558 | 6/1992 |
| JP | 5 265472 | 10/1993 |
| JP | 6 3 195043 | 8/1998 |
| JP | 11 355748 | 12/1999 |
| KR | 20-0174251 | 3/2000 |

* cited by examiner

VEHICLE INTERIOR STRUCTURE

TECHNICAL FIELD

The present invention relates to a vehicle interior structure, and particularly relates to a vehicle interior structure that is provided with a structure for making communication between occupants easier.

BACKGROUND ART

Heretofore, the following has been known as this kind of vehicle interior structure (for example, see Patent Reference 1). For example, in Patent Reference 1, an example of a vehicle interior sound regulation apparatus is disclosed. In the example of Patent Reference 1, an acoustic lens is provided in a headrest side portion of a front seat, such that the sound of an occupant sitting on a rear seat can be clearly heard by an occupant sitting on the front seat.

Patent Reference 1: Japanese Utility Model Application Laid-Open (JP-U) No. H4-71558
Patent Reference 2: Japanese Patent Application Laid-Open (JP-A) No. H11-355748
Patent Reference 3: JP-A No. S63-195043
Patent Reference 4: JP-U No. S61-1515

DISCLOSURE OF INVENTION

Problem to be Solved by the Invention

However, in the example recited in Patent Reference 1, although the sound of the occupant sitting on the rear seat is clearly heard by the occupant sitting on the front seat, conversely, the sound of the occupant sitting on the front seat is not clearly heard by the occupant sitting on the rear seat. Therefore, there is room for improvement to make communication between occupants sitting on a front seat and a rear seat easier, that is, to realize a more amenable vehicle interior space.

The present invention has been made in consideration of the above circumstances, and an object is to provide a vehicle interior structure that may realize a more amenable vehicle interior space by making communication between occupants sitting on a pair of vehicle seats easier.

Means for Solving the Problem

In order to solve the problem, a vehicle interior structure of the present invention is provided with: a pair of vehicle seats; and a sound-reflecting communication unit for conveying a sound produced from occupants sitting, respectively, on the pair of vehicle seats to the other occupant, while reflecting and converging the sound.

According to this vehicle interior structure, when a sound is produced from the occupants respectively sitting on the pair of vehicle seats, the sound is conveyed while being reflected and converged by the sound-reflecting communication unit toward the other occupant. That is, a sound produced from either occupant may be conveyed to the other occupant. Moreover, a sound produced from the occupants respectively sitting on the pair of vehicle seats may be conveyed while being reflected and converged by the sound-reflecting communication unit rather than simply being reflected and conveyed toward the other occupant. Therefore, communication between the occupants sitting on the pair of vehicle seats may be made easier, and thus a more amenable vehicle interior space may be realized.

Herein, it is excellent if the aforementioned sound-reflecting communication unit is structured to be capable of forming a concave shape along a virtual ellipse, whose focuses are at positions of the heads of the occupants, respectively.

Now, in general, a concave surface along an ellipse has the characteristic that a sound produced from one focus of the ellipse is conveyed while being reflected and converged on the other focus of the ellipse. Therefore, when the sound-reflecting communication unit forms a concave shape along a virtual ellipse whose focuses are at the head positions of the occupants as described above, a sound from the head of one occupant whose head is positioned at one focus of the virtual ellipse may be conveyed while being converged toward the head of the occupant positioned at the other focus of the virtual ellipse.

Further, it is excellent if this vehicle interior structure is provided with a switching unit for switching between a first mode, in which a sound produced from the occupants is conveyed to the other occupant while being reflected and converged by the sound-reflecting communication unit, and a second mode, in which communicability of sounds between the occupants is lower than in the first mode.

According to this vehicle interior structure, when the first mode is switched to by the switching unit, a sound produced from an occupant may be conveyed while being reflected and converged toward the other occupant by the sound-reflecting communication unit. Thus, communication between the occupants sitting on the pair of vehicle seats may be made easier. On the other hand, when the second mode is switched to by the switching unit, communicability of sounds between the occupants is lower than in the first mode. Thus, privacy between the occupants sitting on the pair of vehicle seats may be maintained. Thus, by switching between the first mode and the second mode with the switching unit, a vehicle interior space that makes communication between the occupants easier and a vehicle interior space capable of maintaining privacy between the occupants may both be established. Thus, an amenable vehicle interior space may be realized in accordance with the intentions of the occupants.

Further, in this vehicle interior structure, it is excellent if the switching unit is a screen unit that is capable of attaining an exposed state, in which the sound-reflecting communication unit is exposed to the pair of vehicle seats, and a covered state, in which the sound-reflecting communication unit is hidden from the pair of vehicle seats.

According to this vehicle interior structure, when the screen unit serving as the switching unit is set to the exposed state in which the sound-reflecting communication unit is exposed to the pair of vehicle seats, a sound produced from an occupant may be conveyed while being reflected and converged toward the other occupant by the sound-reflecting communication unit. On the other hand, when the screen unit serving as the switching unit is set to the covered state in which the sound-reflecting communication unit is hidden from the pair of vehicle seats, communicability of sounds between the occupants may be made lower than in the above-described exposed state. Thus, by switching the screen portion between the exposed state and the covered state, the first mode in which a sound produced from an occupant is conveyed while being reflected and converged toward the other occupant by the sound-reflecting communication unit and the second mode in which communicability of sounds between the occupants is lower than in the first mode may be switched between.

Further, in this vehicle interior structure, it is excellent if the screen unit includes a winding-type cover member that is windable onto a winding member, and the screen unit is set to the exposed state by the winding-type cover member being wound onto the winding member and set to the covered state by the winding-type cover member being deployed from the winding member.

According to this vehicle interior structure, the screen unit may be set to the exposed state by the winding-type cover member being wound onto the winding member, and the screen unit may be set to the covered state by the winding-type cover member being deployed from the winding member.

Further, in this vehicle interior structure, it is excellent if the screen unit includes a sliding-type cover member that is slidable between a stowed position and a deployed position of the vehicle interior, and the screen unit is set to the exposed state by the sliding-type cover member being slid to the stowed position and set to the covered state by the sliding-type cover member being slid to the deployed position.

According to this vehicle interior structure, the screen unit may be set to the exposed state by the sliding-type cover member being slid to the stowed position, and the screen unit may be set to the covered state by the sliding-type cover member being slid to the deployed position.

Further, in this vehicle interior structure, it is excellent if the screen unit is a plurally divided structure.

According to this vehicle interior structure, the screen unit is formed as a structure that is plurally divided. Thus, the whole screen unit may be switched between the exposed state and the covered state simply by driving a portion of the screen unit. Thus, compared with a case in which the whole screen unit is driven to be switched between the exposed state and the covered state, a structure for driving the screen unit may be made simpler.

Further, in this vehicle interior structure, it is excellent if the sound-reflecting communication unit is fixedly provided at a vehicle member provided in the vehicle.

According to this vehicle interior structure, an amenable vehicle interior space that makes communication between the occupants sitting on the pair of vehicle seats easier may be realized with a simple structure, in that the sound-reflecting communication unit is fixedly provided at the vehicle member provided in the vehicle.

Further, in this vehicle interior structure, it is excellent if the sound-reflecting communication unit is plurally provided in the vehicle.

According to this vehicle interior structure, the sound-reflecting communication unit is plurally provided in the vehicle. Thus, compared to a case of sound conveyance between the occupants by a single large sound-reflecting communication unit, individual sizes of the sound-reflecting communication units may be made smaller. Therefore, an amenable vehicle interior space, in which communication between the occupants sitting on the pair of vehicle seats is made easier, may be realized while a reduction of vehicle interior space due to occupation by the sound-reflecting communication unit is kept to a minimum.

Further, in this vehicle interior structure, it is excellent if the switching unit is an alterable body at which the sound-reflecting communication unit is integrally provided and that is capable of attaining a first attitude, with which a sound produced from the occupants is conveyed while being reflected and converged to the other occupant by the sound-reflecting communication unit, and a second attitude, with which communicability of sounds between the occupants is lower than with the first attitude.

According to this vehicle interior structure, when the alterable body serving as the switching unit is set to the first attitude, a sound produced from an occupant may be conveyed while being reflected and converged toward the other occupant by the sound-reflecting communication unit. On the other hand, when the alterable body serving as the switching unit is set to the second attitude, communicability of sounds between the occupants may be made lower than in the exposed state. Thus, by switching the alterable body between the first attitude and the second attitude, it is possible to switch between the first mode, in which a sound produced from an occupant may be conveyed while being reflected and converged toward the other occupant by the sound-reflecting communication unit, and the second mode, in which the communicability of sounds between the occupants is lower than in the first mode. In addition, because the alterable body may be directly changed in attitude, there is no need to separately provide, for example, the above-mentioned screen unit for switching between the first mode and the second mode, or the like. Therefore, with a simpler structure, a vehicle interior space that makes communication between the occupants easier and a vehicle interior space in which privacy between the occupants may be maintained may both be established.

Further, in this vehicle interior structure, it is excellent if the alterable body includes a sliding body, which is provided with a sliding position thereof in the vehicle being alterable, and the alterable body is switched between the first attitude and the second attitude by the sliding position of the sliding body being altered.

According to this vehicle interior structure, the alterable body may be switched between the first attitude and the second attitude by the sliding position of the sliding body being altered.

Further, in this vehicle interior structure, it is excellent if the alterable body includes a displacing body, which is provided with a reflecting surface that constitutes the sound-reflecting communication unit and is provided with a direction of the reflecting surface in the vehicle being alterable, and the alterable body is switched between the first attitude and the second attitude by the displacing body altering the direction of the reflecting surface.

According to this vehicle interior structure, the alterable body may be switched between the first attitude and the second attitude by the direction of the reflecting surface being altered.

Further, in this vehicle interior structure, it is excellent if the alterable body includes a deforming body, which is provided with a shape of at least a portion thereof in the vehicle being deformable, and the alterable body is switched between the first attitude and the second attitude by the deforming body altering the shape of the at least a portion.

According to this vehicle interior structure, the alterable body may be switched between the first attitude and the second attitude by the shape of the at least a portion being altered.

Further, in this vehicle interior structure, it is excellent if the alterable body includes a turning body, which is provided with a turn angle thereof in the vehicle being alterable, and the alterable body is switched between the first attitude and the second attitude by the turning body altering the turn angle.

According to this vehicle interior structure, the alterable body may be switched between the first attitude and the second attitude by the turn angle being altered.

Further, in this vehicle interior structure, it is excellent if the alterable body is a structure that includes a plurality of the turning body.

According to this vehicle interior structure, the alterable body is structured to plurally include the turning body. Thus, compared to a case of structuring with a single large turning body, individual turning ranges of the turning bodies may be made smaller. Therefore, a more amenable vehicle interior space, in which communication between the occupants sitting on the pair of vehicle seats is made easier, may be realized while space needed for reserving the turning ranges of the turning bodies in the vehicle interior space is kept to a minimum.

Further, in this vehicle interior structure, it is excellent if the turning body includes: a reflecting surface that constitutes the sound-reflecting communication unit; and an absorbing surface capable of absorbing a sound produced from the occupants.

According to this vehicle interior structure, by the turning body being turned such that the reflecting surface faces toward the occupants, a sound produced from an occupant may be conveyed while being reflected and converged toward the other occupant by the sound-reflecting communication unit. On the other hand, by the turning body being turned such that the absorbing surface faces toward the occupants, a sound produced from an occupant may be absorbed by the absorbing surface and communicability of sounds between the occupants may be made lower.

Further, in this vehicle interior structure, it is excellent if the sound-reflecting communication unit is provided at a ceiling region in the vehicle.

According to this vehicle interior structure, because the sound-reflecting communication unit is provided at the ceiling region in the vehicle, interference with equipment of a sound produced from the occupants respectively sitting on the pair of vehicle seats may be suppressed and this sound conveyed further to the other occupant.

Further, it is excellent if this vehicle interior structure includes: a reflecting surface that constitutes the sound-reflecting communication unit and is deformable to a first deformation state, in which a sound produced from the occupants can be conveyed to the other occupant while being reflected and converged by the sound-reflecting communication unit, and a second deformation state, in which communicability of sounds between the occupants is lower than in the first deformation state; an absorbing surface capable of absorbing a sound produced from the occupants; a deforming unit for deforming the reflecting surface from the second deformation state to the first deformation state; and a switching unit for switching between a first mode, in which the reflecting surface faces the heads of the occupants, and a second mode, in which the absorbing surface faces the heads of the occupants.

According to this vehicle interior structure, when the first mode is switched to by the switching unit and the reflecting surface is deformed to the first deformation state by the deforming unit, the reflecting surface faces toward the heads of the occupants and constitutes the sound-reflecting communication unit, forming a shape that conveys a sound produced from an occupant while reflecting and converging the sound toward the other occupant. Therefore, a sound produced from an occupant may be conveyed while being reflected and converged toward the other occupant by the reflecting surface. Thus, communication between the occupants sitting on the pair of vehicle seats may be made easier. On the other hand, when the second mode is switched to by the switching unit, the absorbing surface faces toward the heads of the occupants. Thus, a sound produced from an occupant may be absorbed by the absorbing surface. Therefore, communicability of sounds between the occupants may be made lower than in the above-described first mode. Thus, privacy between the occupants sitting on the pair of vehicle seats may be maintained. Thus, a vehicle interior space that makes communication between the occupants easier and a vehicle interior space capable of maintaining privacy between the occupants may both be established. Thus, an amenable vehicle interior space may be realized in accordance with the intentions of the occupants.

Further, in this vehicle interior structure, it is excellent if the reflecting surface and the absorbing surface are provided at an endless belt, the deforming unit is a mating unit for causing a rear face of the reflecting surface of the endless belt to mate with a rear face of the absorbing surface and causing the reflecting surface to deform from the second deformation state to the first deformation state, and the switching unit is a turning unit for causing the endless belt to turn so as to switch between the first mode and the second mode.

According to this vehicle interior structure, when the turning body serving as the switching unit is used to turn the endless belt and make the reflecting surface face the heads of the occupants, and the rear face of the reflecting surface of the endless belt is mated to the rear face of the absorbing surface by the mating unit serving as the deforming unit, the reflecting surface faces the heads of the occupants and forms a shape that constitutes the sound-reflecting communication unit and conveys a sound produced from an occupant while reflecting and converging the sound toward the other occupant. Therefore, a sound produced from an occupant may be conveyed while being reflected and converged toward the other occupant by the reflecting surface. On the other hand, when the turning body serving as the switching unit is used to turn the endless belt from this state, the mated state of the mating unit is released, and thereafter the absorbing surface is made to face toward the heads of the occupants. Therefore, a sound produced from an occupant may be absorbed by the absorbing surface, and communicability of sounds between the occupants may be made lower than in the above-described first mode.

Further, in this vehicle interior structure, it is excellent if the reflecting surface and the absorbing surface are provided at one face and another face of the vehicle member, the deforming unit is a mating unit for causing a rear face of the reflecting surface of the vehicle member to mate with a rear face of the absorbing surface and causing the reflecting surface to deform from the second deformation state to the first deformation state, and the switching unit is a turning support unit that supports the vehicle member to be turnable in the vehicle so as to switch between the first mode and the second mode.

According to this vehicle interior structure, when the turning support unit serving as the switching unit is used to turn the vehicle member such that the reflecting surface faces the heads of the occupants, and the rear face of the reflecting surface of the vehicle member is mated to the rear face of the absorbing surface by the mating unit serving as the deforming unit, the reflecting surface constituting the sound-reflecting communication unit faces the heads of the occupants and forms a shape that conveys a sound produced from an occupant while reflecting and converging the sound toward the other occupant. Therefore, a sound produced from an occupant may be conveyed while being reflected and converged toward the other occupant by the reflecting surface. On the other hand, when the turning support unit serving as the switching unit is used to turn the vehicle member such that the absorbing surface is made to face the heads of the occupants, a sound produced from an occupant may be absorbed by the absorbing surface. Thus, communicability of sounds between the occupants may be made lower than in the above-described first mode.

Further, it is excellent if this vehicle interior structure includes: an occupant state detection unit that detects a state of the occupants; a switching driving unit that drives the switching unit for switching between the first mode and the second mode; and a switching control unit that controls the switching driving unit on the basis of a detection result from the occupant state detection unit.

According to this vehicle interior structure, when the state of the occupants is detected by the occupant state detection unit, the switching control unit controls the switching driving unit on the basis of detection results from the occupant state detection unit. Accordingly, the switching unit is driven and switched between the first mode and the second mode. Therefore, the first mode and second mode may be switched between automatically in accordance with states of the occupants. Thus, an amenable vehicle interior space that reflects states of occupants may be realized.

Further, it is excellent if this vehicle interior structure includes an alteration unit for altering at least one of a position and a shape of the sound-reflecting communication unit.

According to this vehicle interior structure, because the alteration unit is used, at least one of a position and a shape of the sound-reflecting communication unit may be changed in accordance with, for example, a position of an occupant. Thus, an amenable vehicle interior space may be maintained even if positions of the occupants change.

Further, it is excellent if this vehicle interior structure includes: an occupant state detection unit that detects a state of the occupants; an alteration driving unit for driving the alteration unit; and an alteration control unit that controls the alteration driving unit on the basis of a detection result from the occupant state detection unit.

According to this vehicle interior structure, when the state of the occupants is detected by the occupant state detection unit, the alteration control unit controls the alteration driving unit on the basis of detection results from the occupant state detection unit. Accordingly, the alteration unit is driven by the alteration driving unit. Therefore, the alteration unit may be driven automatically in accordance with states of the occupants. Thus, an amenable vehicle interior space that reflects states of occupants may be realized.

Effects of the Invention

As detailed hereabove, according to the present invention, a more amenable vehicle interior space may be realized by making communication between occupants sitting on a pair of vehicle seats easier.

BEST MODE FOR CARRYING OUT THE INVENTION

[First Exemplary Embodiment]
Firstly, a first exemplary embodiment of the present invention is described.

Figure 1:
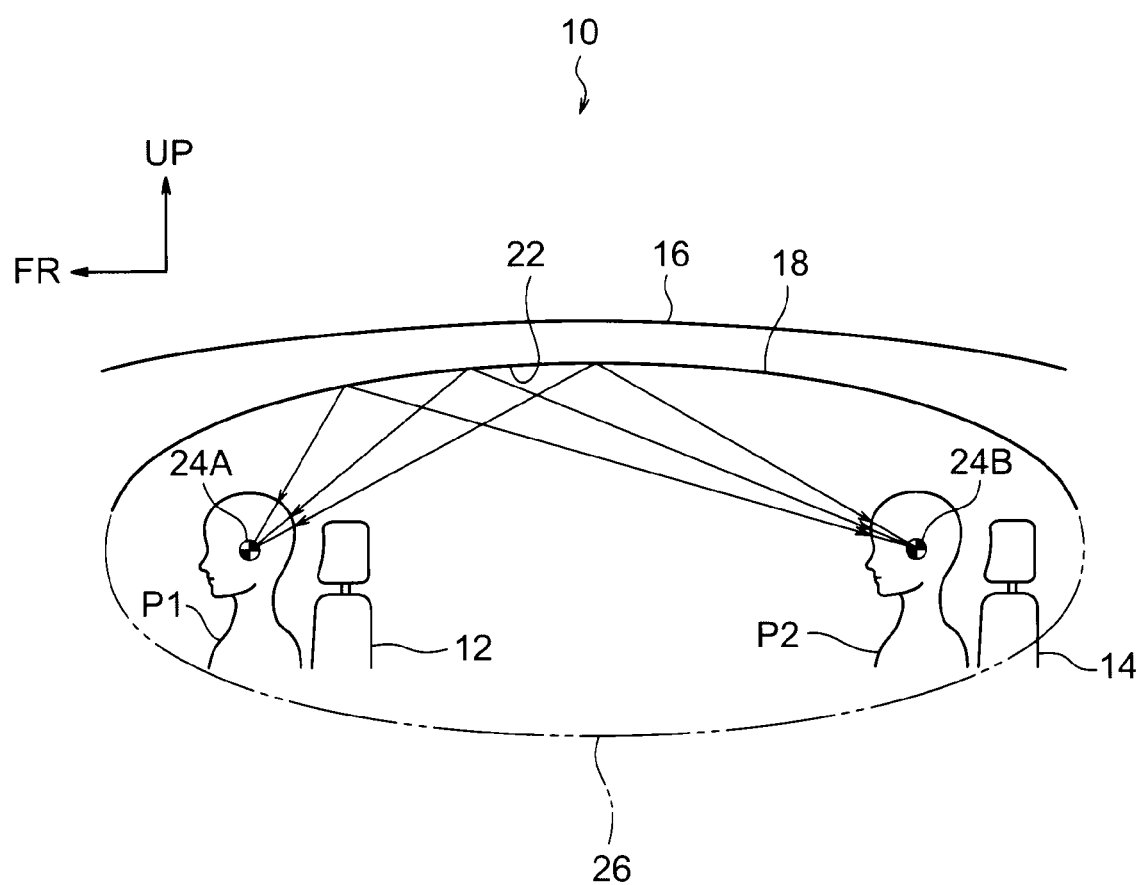
FIG. 1 is a side view illustrating overall structure of a vehicle interior structure relating to a first exemplary embodiment of the present invention.

In FIG. 1, overall structure of a vehicle interior structure 10 relating to the first exemplary embodiment of the present invention is illustrated in side view.

The vehicle interior structure 10 relating to the first exemplary embodiment of the present invention is excellently employed in a vehicle such as, for example, a minivan or the like, and is provided with a pair of vehicle seats 12 and 14 arranged in a vehicle longitudinal direction. The vehicle seat 12 at the front is formed as, for example, a driver seat, and the vehicle seat 14 at the rear is formed as, for example, a driver side third row seat.

A ceiling member 18 which constitutes a ceiling region in the vehicle (and corresponds to a vehicle member of the present invention) is provided at the inner side of a roof outer plate 16. A sound-reflecting communication unit 22 is fixedly provided at this ceiling member 18. The sound-reflecting communication unit 22 is for reflecting and conveying a sound produced from occupants P1 and P2, who are respectively sitting on the pair of vehicle seats 12 and 14, to the other passenger.

This sound-reflecting communication unit 22 forms a concave shape along a virtual ellipse 26, focuses 24A and 24B of which are respectively at positions of the heads of the occupants P1 and P2 respectively sitting on the pair of vehicle seats 12 and 14.

According to the vehicle interior structure 10 relating to the first exemplary embodiment of the present invention, the following characteristic operations and effects are accomplished.

That is, according to the vehicle interior structure 10 relating to the first exemplary embodiment of the present invention, the sound-reflecting communication unit 22 forms a concave shape along the virtual ellipse 26 whose focuses 24A and 24B are respectively at the positions of the heads of the occupants P1 and P2 respectively sitting on the pair of vehicle seats 12 and 14.

In general, a concave face along an ellipse has the characteristic of conveying a sound produced from one focus of the ellipse to the other focus of the ellipse while reflecting and converging the sound.

Therefore, in the vehicle interior structure 10 relating to the first exemplary embodiment of the present invention, when a sound is produced from the front occupant P1 whose head is positioned at the focus 24A of the virtual ellipse 26, the sound from the front occupant P1 may be conveyed while being converged toward the head of the rear occupant P2 positioned at the focus 24B of the virtual ellipse 26.

Similarly, when a sound is produced from the rear occupant P2 whose head is positioned at the focus 24B of the virtual ellipse 26, the sound from the rear occupant P2 may be conveyed while being converged toward the head of the front occupant P1 positioned at the focus 24A of the virtual ellipse 26.

Moreover, a sound produced from the occupants P1 and P2 respectively sitting on the pair of vehicle seats 12 and 14 may be conveyed while being reflected and converged by the sound-reflecting communication unit 22 rather than simply being reflected and conveyed toward the other occupant.

Therefore, communication between the occupants P1 and P2 sitting on the pair of vehicle seats 12 and 14 may be made easier, and thus a more amenable vehicle interior space may be realized.

Further, according to the vehicle interior structure 10 relating to the first exemplary embodiment of the present invention, an amenable vehicle interior space that makes communication between the occupants P1 and P2 sitting on the pair of vehicle seats 12 and 14 easier may be realized with a simple structure, in that the sound-reflecting communication unit 22 is fixedly provided at the ceiling member 18 provided in the vehicle.

Further, according to the vehicle interior structure 10 relating to the first exemplary embodiment of the present invention, because the sound-reflecting communication unit 22 is provided at the ceiling region in the vehicle, interference with equipment of a sound produced from the occupants P1 and P2 respectively sitting on the pair of vehicle seats 12 and 14 may be suppressed and this sound may be conveyed further to the other occupant.

In the vehicle interior structure 10 relating to the first exemplary embodiment of the present invention, the sound-reflecting communication unit 22 is provided at the ceiling member 18 but may be provided at other vehicle members apart from the ceiling member 18, such as an instrument panel, door trims and the like.

Further, in the vehicle interior structure 10 relating to the first exemplary embodiment of the present invention, the sound-reflecting communication unit 22 is structured such that a cross-section when cut in the vehicle longitudinal direction forms the concave shape along the virtual ellipse. However, it may be structured as follows.

If, for example, it is assumed that the occupant P2 sitting on the rear vehicle seat 14 is offset relative to the occupant P1 sitting on the front vehicle seat 12 (for example, if the front vehicle seat 12 is a passenger seat and the rear vehicle seat 14 is a driver side third row seat or the like), it may be structured such that a cross-section when cut along the vehicle lateral direction also forms a concave shape along a virtual ellipse whose focuses are respectively at the positions of the heads of the occupants P1 and P2. Further, a cross-section cut along the vehicle lateral direction may form a concave shape along a virtual ellipse whose focuses are respectively at the positions of the heads of occupants who are next to one another in the vehicle lateral direction.

[Second Exemplary Embodiment]

Next, a second exemplary embodiment of the present invention is described.

Figure 2:
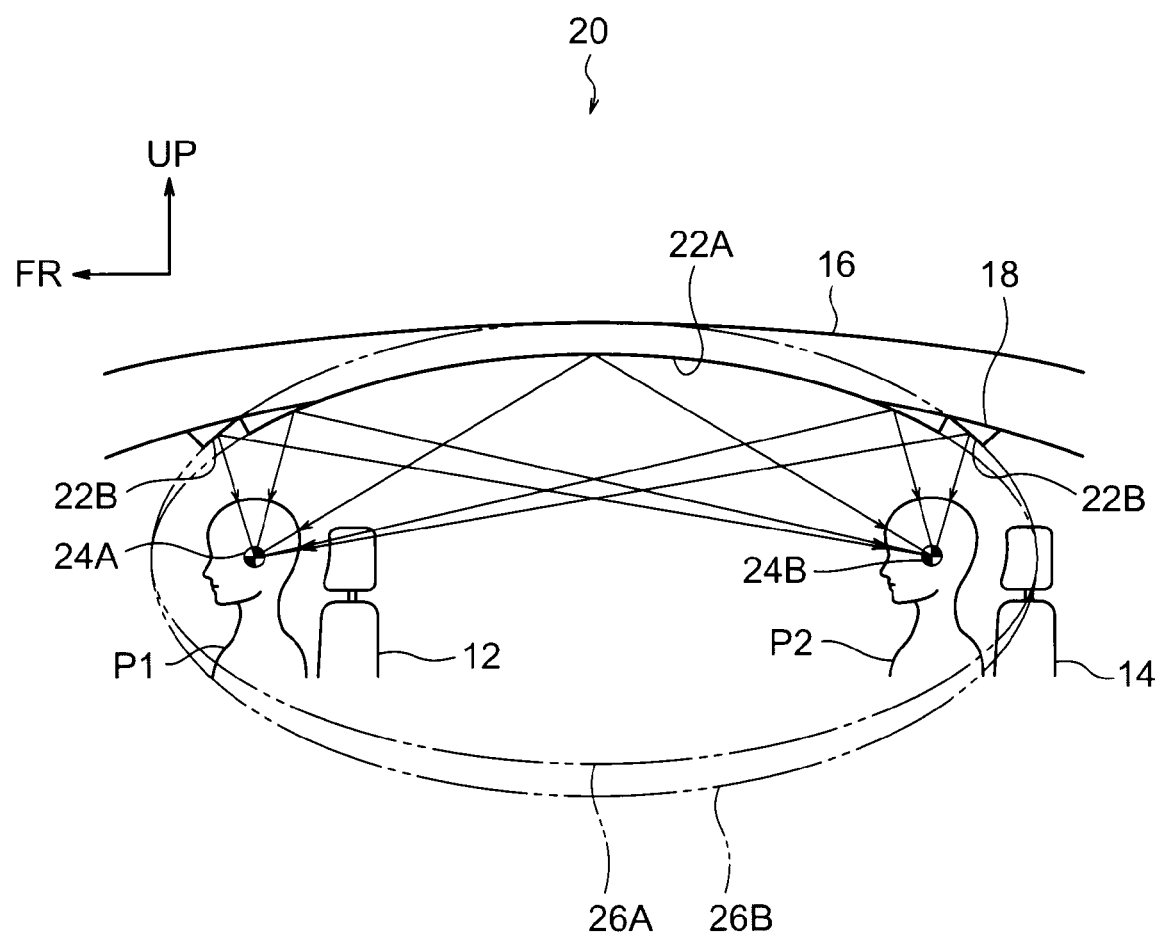
FIG. 2 is a side view illustrating overall structure of a vehicle interior structure relating to a second exemplary embodiment of the present invention.

In FIG. 2, overall structure of a vehicle interior structure 20 relating to the second exemplary embodiment of the present invention is illustrated in side view.

In the vehicle interior structure 20 relating to the second exemplary embodiment of the present invention, the structure of the ceiling member 18 is changed from that in the vehicle interior structure 10 relating to the above-described first exemplary embodiment of the present invention.

That is, plural sound-reflecting communication units 22A and 22B are fixedly provided at the ceiling member 18. The first sound-reflecting communication unit 22A, which is provided at a middle portion of the ceiling member 18, forms a concave shape along a first virtual ellipse 26A whose focuses focus 24A and focus 24B are respectively at positions of the heads of the occupants P1 and P2 respectively sitting on the pair of vehicle seats 12 and 14.

The second sound-reflecting communication units 22B, which are respectively provided at the front and rear of the ceiling member 18 relative to the first sound-reflecting communication unit 22A, form concave shapes along a second virtual ellipse 26B, which has a different short diameter from the first virtual ellipse 26A, and whose focuses 24A and 24B are respectively at positions of the heads of the occupants P1 and P2 respectively sitting on the pair of vehicle seats 12 and 14.

Such that a sound reflected by one of the first sound-reflecting communication unit 22A and the second sound-reflecting communication units 22B does not interfere with the other, the second sound-reflecting communication units 22B are disposed at positions away from lines that join the first sound-reflecting communication unit 22A with the focuses 24A and 24B, and the first sound-reflecting communication unit 22A is disposed at positions away from lines that join the second sound-reflecting communication units 22B with the focuses 24A and 24B.

According to the vehicle interior structure 20 relating to the second exemplary embodiment of the present invention, the following characteristic operations and effects are accomplished.

That is, according to the vehicle interior structure 20 relating to the second exemplary embodiment of the present invention, because the plural sound-reflecting communication units 22A and 22B are provided in the vehicle, a sound produced from the occupants P1 and P2 respectively sitting on the pair of vehicle seats 12 and 14 may be conveyed while being reflected and converged toward the other occupant by the plural sound-reflecting communication units 22A and 22B.

Further, in comparison with a case of sound conveyance between the occupants P1 and P2 by the single large sound-reflecting communication unit 22 as in the vehicle interior structure 10 relating to the above-described first exemplary embodiment of the present invention, individual sizes of the sound-reflecting communication units 22A and 22B may be made smaller.

That is, in the above-described vehicle interior structure 20 relating to the first exemplary embodiment of the present invention, the size of the first sound-reflecting communication unit 22A may be made smaller by the provision of the second sound-reflecting communication units 22B, and extension into the vehicle interior of regions at two ends of the first sound-reflecting communication unit 22A may be reduced.

Therefore, a reduction of vehicle interior space due to occupation by the first sound-reflecting communication unit 22A may be kept to a minimum and an amenable vehicle interior space may be realized, in which communication between the occupants P1 and P2 sitting on the pair of vehicle seats 12 and 14 is made easier.

In the vehicle interior structure 20 relating to the second exemplary embodiment of the present invention, the plural sound-reflecting communication units 22A and 22B are provided at the ceiling member 18 but may be provided at other vehicle members apart from the ceiling member 18.

[Third Exemplary Embodiment]

Next, a third exemplary embodiment of the present invention is described.

Figure 3A:
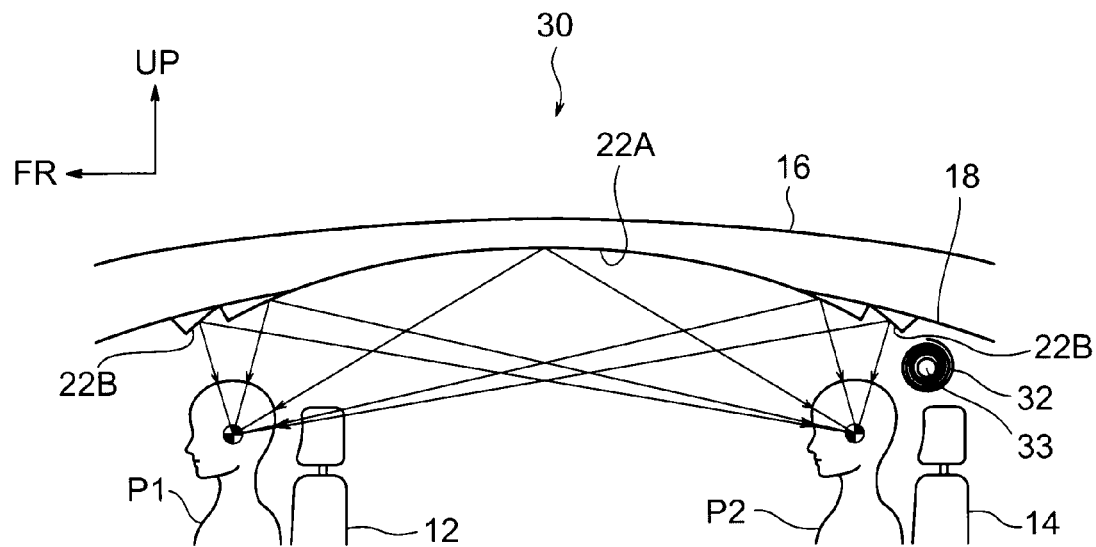
FIG. 3A is a side view illustrating overall structure of a vehicle interior structure relating to a third exemplary embodiment of the present invention.
Figure 3B:
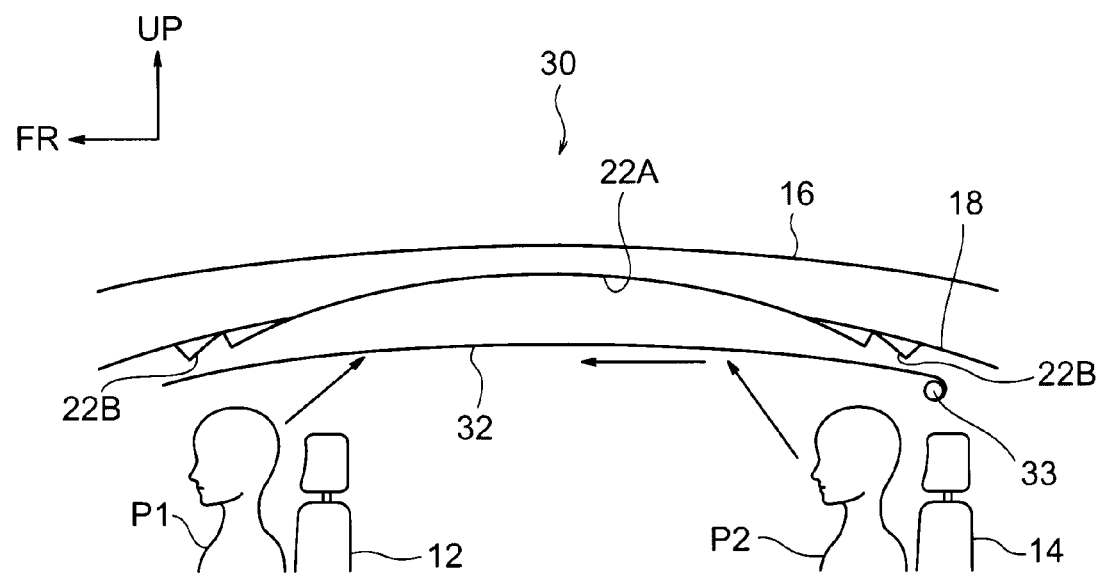
FIG. 3B is a diagram describing operation of the vehicle interior structure illustrated in FIG. 3A.

In FIG. 3A and FIG. 3B, overall structure of a vehicle interior structure 30 relating to the third exemplary embodiment of the present invention is illustrated in side view.

The vehicle interior structure 30 relating to the third exemplary embodiment of the present invention is a structure in which a winding-type cover member 32 (corresponding to a screen unit and switching unit of the present invention) is added to the above-described vehicle interior structure 20 relating to the second exemplary embodiment of the present invention.

The winding-type cover member 32 is disposed between the positions of the heads of the occupants P1 and P2 respectively sitting on the pair of vehicle seats 12 and 14 and the ceiling member 18. This winding-type cover member 32 is constituted by a cloth with high absorptivity or the like, and is windable onto a winding member 33.

According to the vehicle interior structure 30 relating to the third exemplary embodiment of the present invention, the following characteristic operations and effects are accomplished.

That is, according to the vehicle interior structure 30 relating to the third exemplary embodiment of the present invention, when the winding-type cover member 32 is wound onto the winding member 33 and set to an exposed state in which the sound-reflecting communication unit 22 is exposed to the pair of vehicle seats 12 and 14 as illustrated in FIG. 3A (this state of the vehicle interior structure 30 corresponds to a first mode of the present invention), a sound produced from the occupants P1 and P2 is conveyed while being reflected and converged toward the other occupant by the sound-reflecting communication units 22A and 22B. Thus, communication between the occupants P1 and P2 sitting on the pair of vehicle seats 12 and 14 may be made easier.

On the other hand, when the winding-type cover member 32 is deployed from the winding member 33 and set to the covered state in which the sound-reflecting communication units 22A and 22B are hidden from the pair of vehicle seats 12 and 14 as illustrated in FIG. 3B (this state of the vehicle interior structure 30 corresponds to a second mode of the present invention), a sound emitted from the occupants P1 and P2 sitting on the pair of vehicle seats 12 and 14 is absorbed by the winding-type cover member 32, and communicability of sounds between the occupants P1 and P2 is made lower than in the above-described exposed state. Therefore, privacy between the occupants P1 and P2 sitting on the pair of vehicle seats 12 and 14 may be maintained.

Thus, according to the vehicle interior structure 30 relating to the third exemplary embodiment of the present invention, by the winding-type cover member 32 being switched between the exposed state and the covered state, a vehicle interior space that makes communication between the occupants P1 and P2 easier and a vehicle interior space in which privacy between the occupants P1 and P2 may be maintained may both be established. Thus, an amenable vehicle interior space may be realized in accordance with the intentions of the occupants P1 and P2.

Further, according to the vehicle interior structure 30 relating to the third exemplary embodiment of the present invention, even if, for example, the ceiling member 18 is structured with a material with high sound reflectivity, the ceiling member 18 may be covered by the winding-type cover member 32. Thus, reflections of sounds at the ceiling member 18 when there is no communication between the occupants P1 and P2 may be suppressed. Therefore, an amenable vehicle interior space in which noise is suppressed may be realized.

[Fourth Exemplary Embodiment]

Next, a fourth exemplary embodiment of the present invention is described.

Figure 4A:
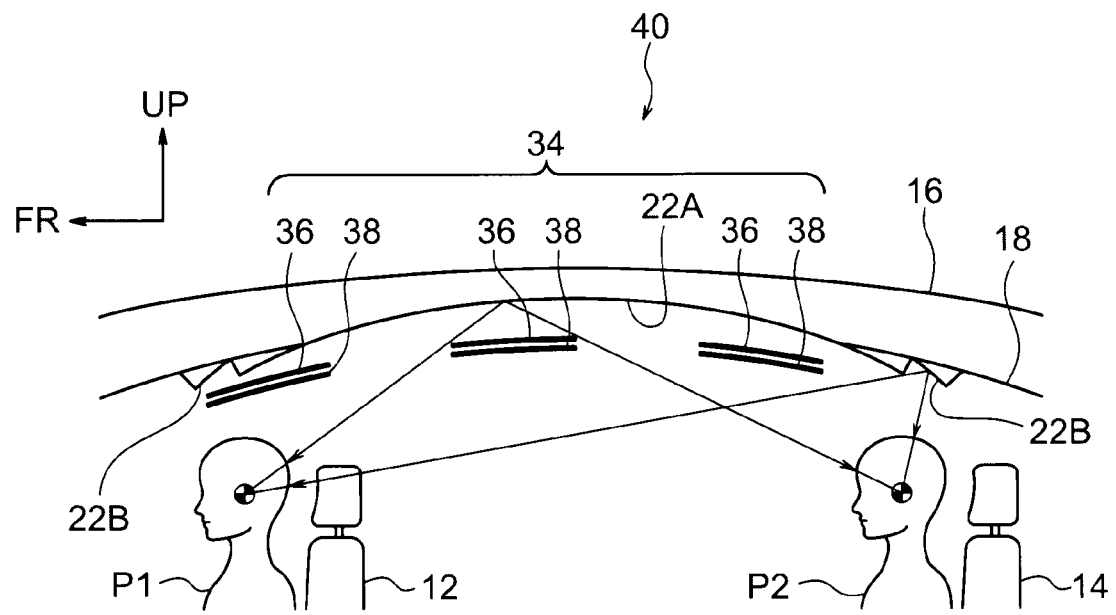
FIG. 4A is a side view illustrating overall structure of a vehicle interior structure relating to a fourth exemplary embodiment of the present invention.
Figure 4B:
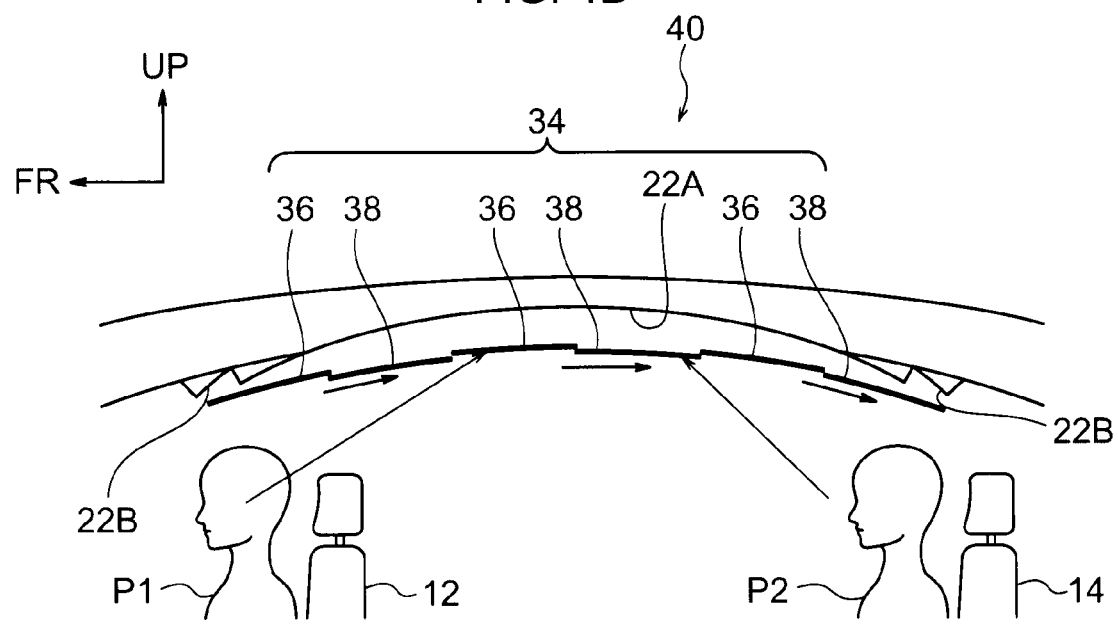
FIG. 4B is a diagram describing operation of the vehicle interior structure illustrated in FIG. 4A.
Figure 5A:
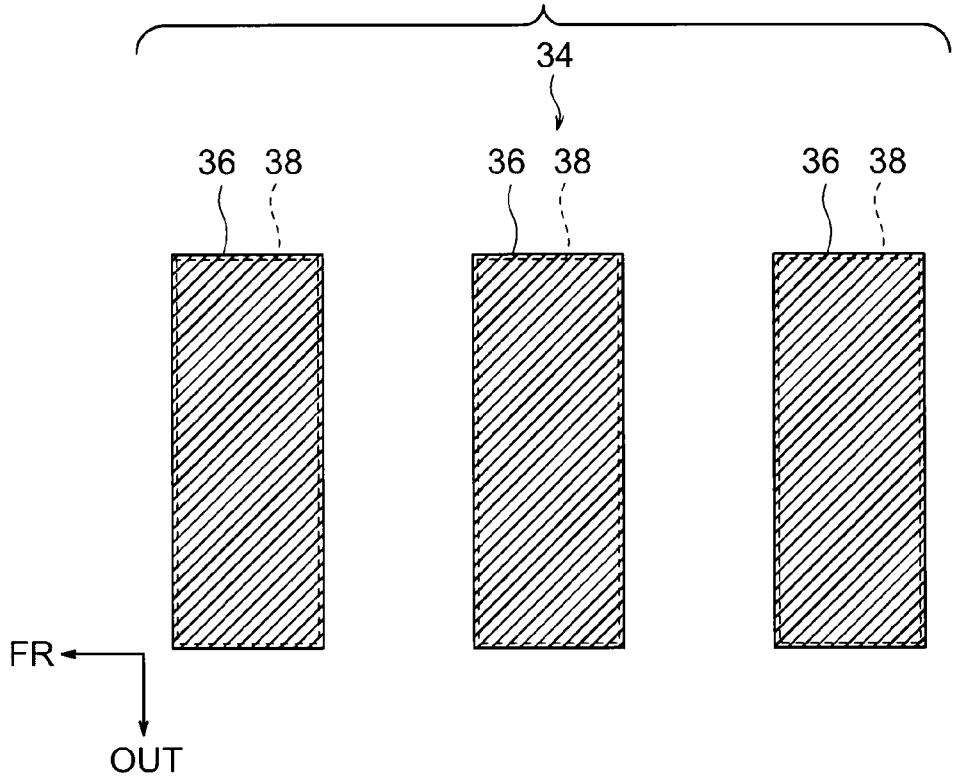
FIG. 5A is a plan view of a screen member in FIG. 4A.
Figure 5B:
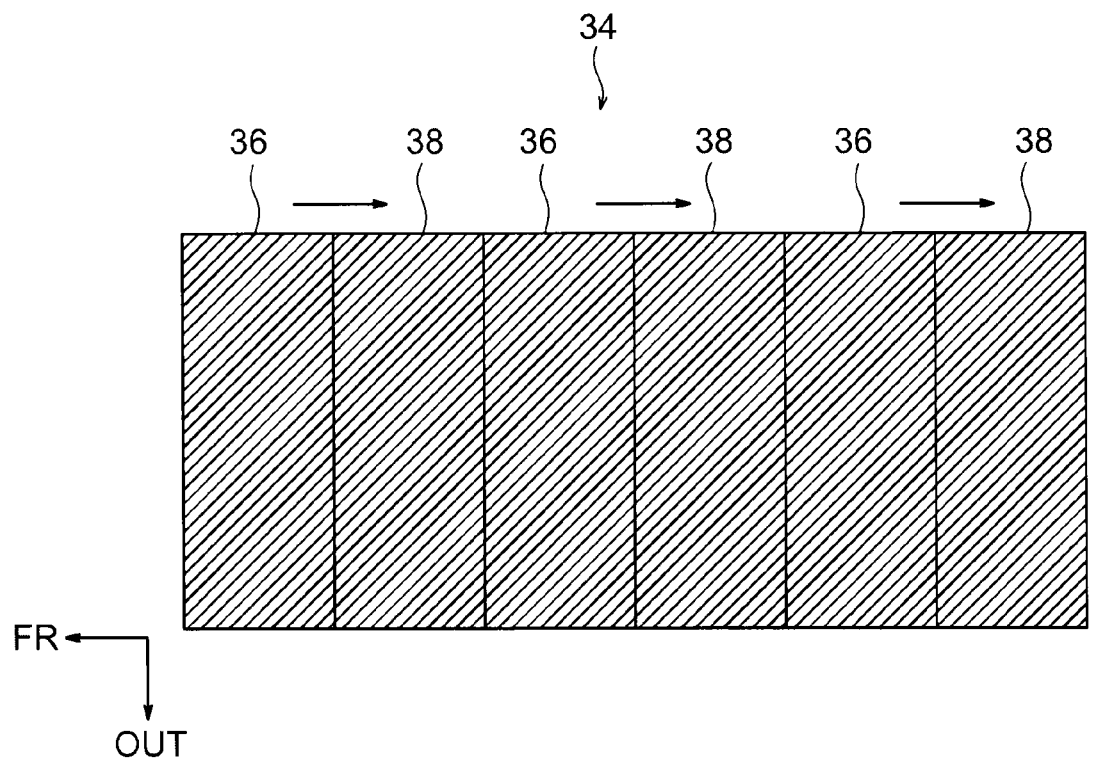
FIG. 5B is a plan view of a screen member in FIG. 4B.

In FIG. 4A and FIG. 4B, overall structure of a vehicle interior structure 40 relating to the fourth exemplary embodiment of the present invention is illustrated in side view. In FIG. 5A and FIG. 5B, overall structure of a screen member 34 that is provided in this vehicle interior structure 40 is illustrated in plan view.

The vehicle interior structure 40 relating to the fourth exemplary embodiment of the present invention is a structure in which the screen member 34 (corresponding to the screen unit and switching unit of the present invention) is provided to the above-described vehicle interior structure 30 relating to the third exemplary embodiment of the present invention, instead of the winding-type cover member 32.

The screen member 34 is disposed between the positions of the heads of the occupants P1 and P2 respectively sitting on the pair of vehicle seats 12 and 14 and the ceiling member 18, and is constituted by a cloth with high sound insulation or the like.

This screen member 34 is plurally divided in the vehicle longitudinal direction, and is constituted by plural fixed-type cover members 36 and sliding-type cover members 38. The fixed-type cover members 36 and the sliding-type cover members 38 are both structured in narrow strip shapes that extend in the vehicle lateral direction, as illustrated in FIG. 5A and FIG. 5B.

The fixed-type cover members 36 are fixedly disposed at equidistant intervals in the vehicle longitudinal direction. Meanwhile, the sliding-type cover members 38 are made slidable between stowed positions, which are superposed in a plate thickness direction with the fixed-type cover members 36 as illustrated in FIG. 4A and FIG. 5A, and deployed positions, which are arrayed with the fixed-type cover members 36 in a plan view direction as illustrated in FIG. 4B and FIG. 5B.

According to the vehicle interior structure 40 relating to the fourth exemplary embodiment of the present invention, the following characteristic operations and effects are accomplished.

That is, according to the vehicle interior structure 40 relating to the fourth exemplary embodiment of the present invention, when the sliding-type cover members 38 are slid to the stowed position as illustrated in FIG. 4A and FIG. 5A, the screen member 34 is set to the exposed state in which the sound-reflecting communication units 22A and 22B are exposed to the pair of vehicle seats 12 and 14 (this state of the vehicle interior structure 40 corresponds to the first mode of the present invention).

At this time, a sound produced from the occupants P1 and P2 is conveyed while being reflected and converged toward the other occupant by the sound-reflecting communication units 22A and 22B. Thus, communication between the occupants P1 and P2 sitting on the pair of vehicle seats 12 and 14 may be made easier.

On the other hand, when the sliding-type cover members 38 are slid to the deployed position as illustrated in FIG. 4B and FIG. 5B, the screen member 34 is set to the covered state in which the sound-reflecting communication units 22A and 22B are hidden from the pair of vehicle seats 12 and 14 (this state of the vehicle interior structure 40 corresponds to the second mode of the present invention).

At this time, a sound produced from the occupants P1 and P2 sitting on the pair of vehicle seats 12 and 14 is absorbed by the screen member 34, and communicability of sounds between the occupants P1 and P2 is made lower than in the above-described exposed state. Therefore, privacy between the occupants P1 and P2 sitting on the pair of vehicle seats 12 and 14 may be maintained.

Thus, according to the vehicle interior structure 40 relating to the fourth exemplary embodiment of the present invention, by the screen member 34 being switched between the exposed state and the covered state, a vehicle interior space that makes communication between the occupants P1 and P2 easier and a vehicle interior space in which privacy between the occupants P1 and P2 may be maintained may both be established. Thus, an amenable vehicle interior space may be realized in accordance with the intentions of the occupants P1 and P2.

Further, according to the vehicle interior structure 40 relating to the fourth exemplary embodiment of the present invention, the screen member 34 has the structure that is divided into the fixed-type cover members 36 and the sliding-type cover members 38. Thus, the whole screen member 34 may be switched between the exposed state and the covered state by driving just the sliding-type cover members 38 of the screen member 34. Therefore, in comparison with a case of driving the whole screen member 34 to switch between the exposed state and the covered state, structures for driving the screen member 34 may be made simpler.

In the vehicle interior structure 40 relating to the fourth exemplary embodiment of the present invention, the screen member 34 is plurally divided in the vehicle longitudinal direction and the fixed-type cover members 36 and sliding-type cover members 38 are each structured in narrow strip shapes that extend in the vehicle lateral direction. However, it may be structured as follows.

Figure 6A:
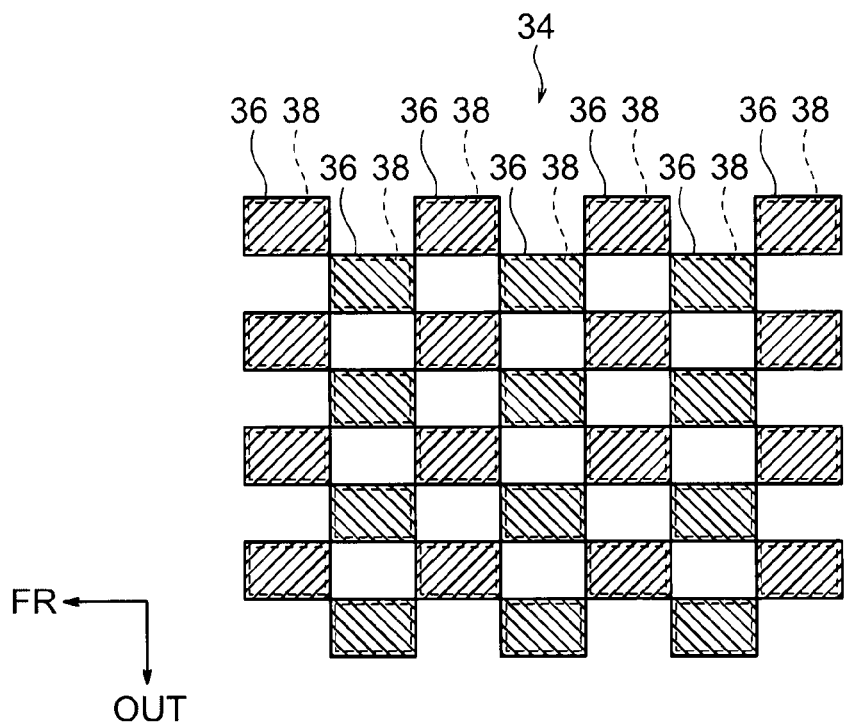
FIG. 6A is a diagram illustrating a variant example of the vehicle interior structure relating to the fourth exemplary embodiment of the present invention.
Figure 6B:
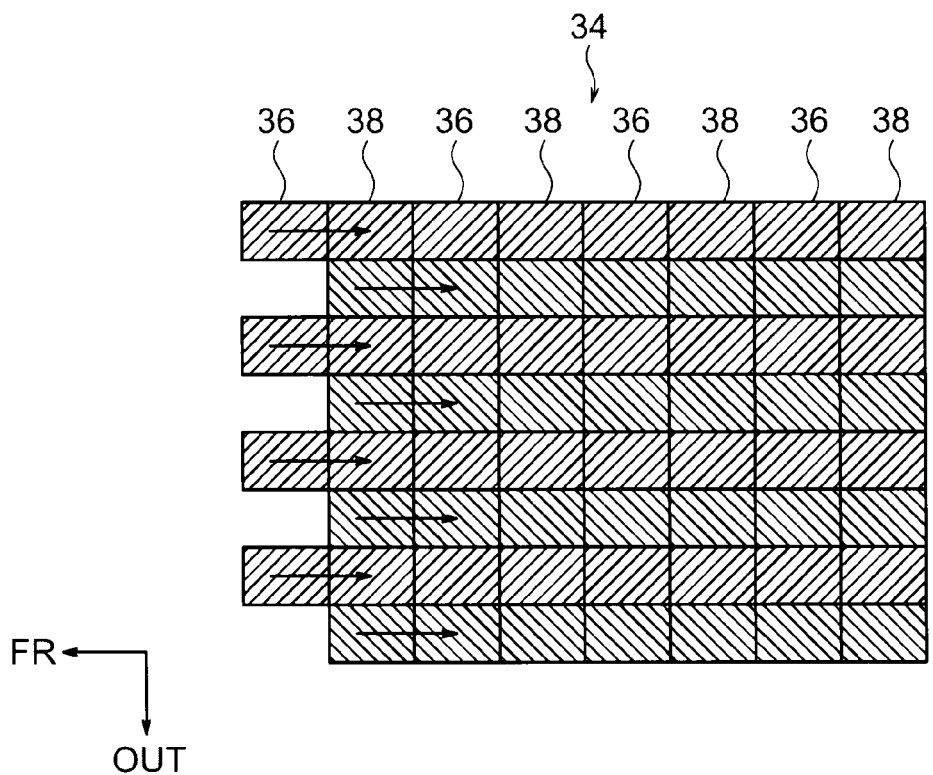
FIG. 6B is a diagram describing operation of the vehicle interior structure illustrated in FIG. 6A.

That is, as illustrated in FIG. 6A and FIG. 6B, the screen member 34 may be plurally divided both in the vehicle longitudinal direction and in the vehicle lateral direction, and the fixed-type cover members 36 and sliding-type cover members 38 respectively constituted in cell shapes.

Further, in the vehicle interior structure 40 relating to the fourth exemplary embodiment of the present invention, the screen member 34 is structured to be divided into the sliding-type cover members 38 and the fixed-type cover members 36, but it may be structured to be divided into the winding-type cover member 32, of the above-described vehicle interior structure 30 relating to the third exemplary embodiment of the present invention, and the fixed-type cover members 36.

Further, in the vehicle interior structure 40 relating to the fourth exemplary embodiment of the present invention, the sound-reflecting communication units 22A and 22B are formed at the ceiling member 18. However, the sound-reflecting communication units 22A and 22B may be formed at the roof outer plate 16 and the ceiling member 18 structured to serve as the screen member.

[Fifth Exemplary Embodiment]

Next, a fifth exemplary embodiment of the present invention is described.

Figure 7A:
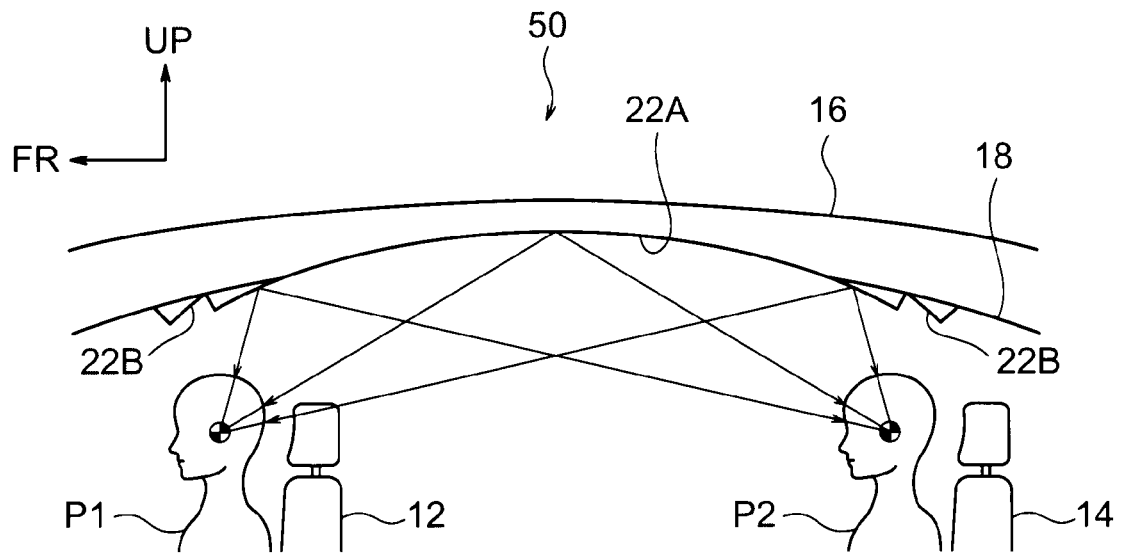
FIG. 7A is a side view illustrating overall structure of a vehicle interior structure relating to a fifth exemplary embodiment of the present invention.
Figure 7B:
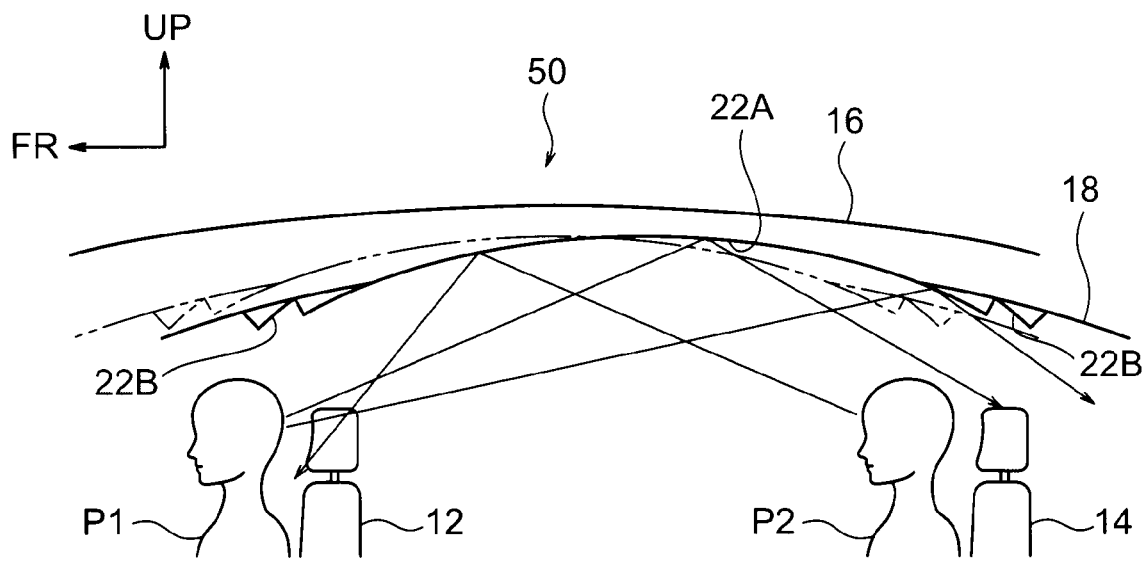
FIG. 7B is a diagram describing operation of the vehicle interior structure illustrated in FIG. 7A.

In FIG. 7A and FIG. 7B, overall structure of a vehicle interior structure 50 relating to the fifth exemplary embodiment of the present invention is illustrated in side view.

The vehicle interior structure 50 relating to the fifth exemplary embodiment of the present invention is a structure in which the ceiling member 18 (corresponding to a vehicle member, switching unit, alterable body and sliding body of the present invention) is provided to the above-described vehicle interior structure 20 relating to the second exemplary embodiment of the present invention, to be slidable in the vehicle longitudinal direction.

That is, the ceiling member 18 is made slidable between a front position as illustrated in FIG. 7A (corresponding to a first attitude of the present invention) and a rear position as illustrated in FIG. 7B (corresponding to a second attitude of the present invention).

According to the vehicle interior structure 50 relating to the fifth exemplary embodiment of the present invention, the following characteristic operations and effects are accomplished.

That is, according to the vehicle interior structure 50 relating to the fifth exemplary embodiment of the present invention, when the ceiling member 18 is slid to the front position as illustrated in FIG. 7A (this state of the vehicle interior structure 50 corresponds to the first mode of the present invention), a sound produced from the occupants P1 and P2 is conveyed while being reflected and converged toward the other occupant by the sound-reflecting communication units 22A and 22B. Thus, communication between the occupants P1 and P2 sitting on the pair of vehicle seats 12 and 14 may be made easier.

On the other hand, when the ceiling member 18 is slid to the rear position as illustrated in FIG. 7B (this state of the vehicle interior structure 50 corresponds to the second mode of the present invention), the focuses are moved to positions that are offset from the heads of the occupants P1 and P2. Therefore, a sound produced from the occupants P1 and P2 is reflected by the sound-reflecting communication units 22A and 22B toward positions different from that of the other occupant. Thus, communicability of sounds between the occupants P1 and P2 may be made lower than when the ceiling member 18 is slid to the front position as illustrated in FIG. 7A, and privacy between the occupants P1 and P2 sitting on the pair of vehicle seats 12 and 14 may be maintained.

Thus, according to the vehicle interior structure 50 relating to the fifth exemplary embodiment of the present invention, by the ceiling member 18 being switched between the front position and the rear position, a vehicle interior space that makes communication between the occupants P1 and P2 easier and a vehicle interior space in which privacy between the occupants P1 and P2 may be maintained may both be established. Thus, an amenable vehicle interior space may be realized in accordance with the intentions of the occupants P1 and P2.

Moreover, because the ceiling member 18 is directly slid, there is no need to separately provide a screening unit or the like, as in the above-described vehicle interior structure 30 relating to the third exemplary embodiment of the present invention and vehicle interior structure 40 relating to the fourth exemplary embodiment of the present invention, in order to switch between the vehicle interior space that makes communication between the occupants P1 and P2 easier and the vehicle interior space that is capable of maintaining privacy between the occupants P1 and P2.

Therefore, the vehicle interior space that makes communication between the occupants P1 and P2 easier and the vehicle interior space in which privacy between the occupants P1 and P2 may be maintained may both be established.

In the vehicle interior structure 50 relating to the fifth exemplary embodiment of the present invention, the sound-reflecting communication units 22A and 22B are provided integrally with the ceiling member 18 and the ceiling member 18 is a structure that slides. However, the sound-reflecting communication units 22A and 22B may be provided integrally with another vehicle member and this vehicle member may be a structure that slides.

[Sixth Exemplary Embodiment]

Next, a sixth exemplary embodiment of the present invention is described.

Figure 8A:
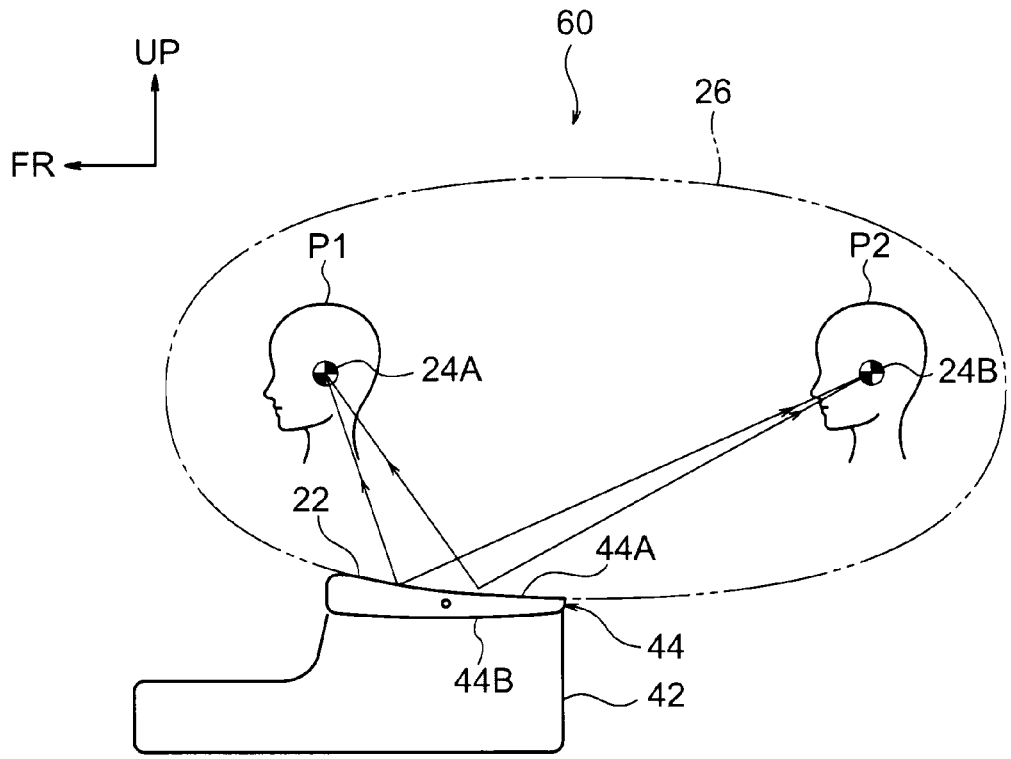
FIG. 8A is a side view illustrating overall structure of a vehicle interior structure relating to a sixth exemplary embodiment of the present invention.
Figure 8B:
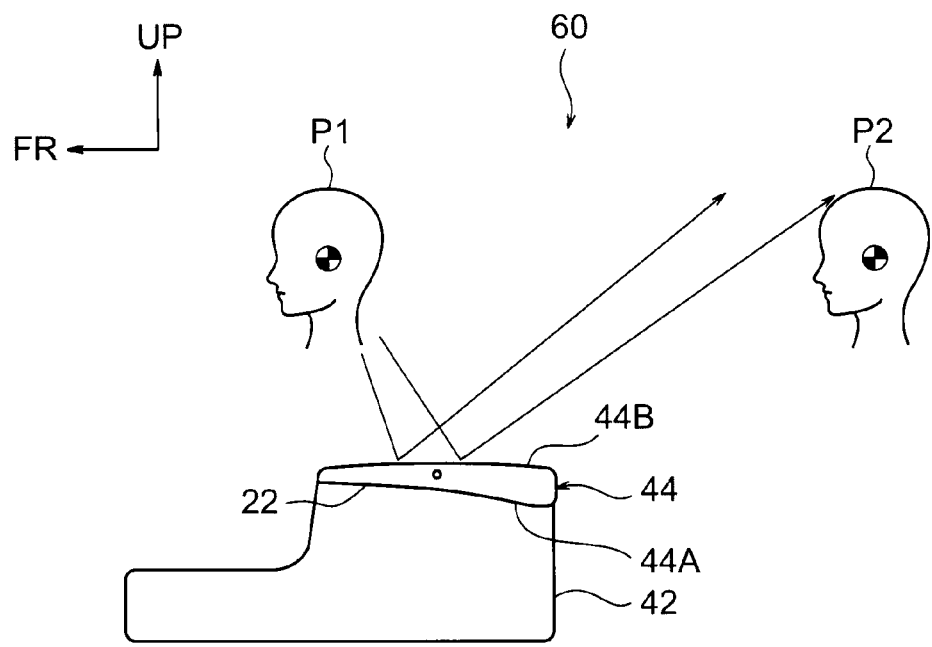
FIG. 8B is a diagram describing operation of the vehicle interior structure illustrated in FIG. 8A.

In FIG. 8A and FIG. 8B, overall structure of a vehicle interior structure 60 relating to the sixth exemplary embodiment of the present invention is illustrated in side view.

In the vehicle interior structure 60 relating to the sixth exemplary embodiment of the present invention, the location of provision of the sound-reflecting communication unit 22 in the vehicle is changed from the above-described vehicle interior structure 10 relating to the first exemplary embodiment of the present invention.

That is, the sound-reflecting communication unit 22 is provided integrally with a console door 44 (corresponding to the vehicle member, switching unit, alterable body and displacing body of the present invention) that is for opening and closing a console box 42.

At the console door 44, one face is formed as a reflecting surface 44A with a concave shape at which the sound-reflecting communication unit 22 is integrally provided, and the other face is formed as a scattering surface 44B with a convex shape capable of scattering a sound produced from the occupants P1 and P2.

This console door 44 is capable of attaining a first attitude in which the reflecting surface 44A faces up, as illustrated in FIG. 8A, and a second attitude in which the reflecting surface 44A faces down, as illustrated in FIG. 8B.

According to the vehicle interior structure 60 relating to the sixth exemplary embodiment of the present invention, the following characteristic operations and effects are accomplished.

That is, according to the vehicle interior structure 60 relating to the sixth exemplary embodiment of the present invention, when the console door 44 is set to the first attitude in which the reflecting surface 44A faces up as illustrated in FIG. 8A (this state of the vehicle interior structure 60 corresponds to the first mode of the present invention), a sound produced from the occupants P1 and P2 is conveyed while being reflected and converged toward the other occupant by the sound-reflecting communication unit 22. Thus, communication between the occupants P1 and P2 sitting on the pair of vehicle seats 12 and 14 may be made easier.

On the other hand, when the console door 44 is set to the second attitude in which the reflecting surface 44A faces down as illustrated in FIG. 8B (this state of the vehicle interior structure 60 corresponds to the second mode of the present invention), a sound produced from the occupants P1 and P2 is scattered by the scattering surface 44B and reflected toward positions different from that of the other occupant. Thus, communicability of sounds between the occupants P1 and P2 may be made lower than when the console door 44 is set to the first attitude in which the reflecting surface 44A faces up as illustrated in FIG. 8A, and privacy between the occupants P1 and P2 sitting on the pair of vehicle seats 12 and 14 may be maintained.

Thus, according to the vehicle interior structure 60 relating to the sixth exemplary embodiment of the present invention, by the console door 44 being turned over, a vehicle interior space that makes communication between the occupants P1 and P2 easier and a vehicle interior space in which privacy between the occupants P1 and P2 may be maintained may both be established. Thus, an amenable vehicle interior space may be realized in accordance with the intentions of the occupants P1 and P2.

In the vehicle interior structure 60 relating to the sixth exemplary embodiment of the present invention, the sound-reflecting communication unit 22 is provided integrally with the console door 44, and this console door 44 is a structure that is turned over. However, the sound-reflecting communication unit 22 may be provided integrally with another vehicle member and this vehicle member may be a structure that is turned over.

Figure 9A:
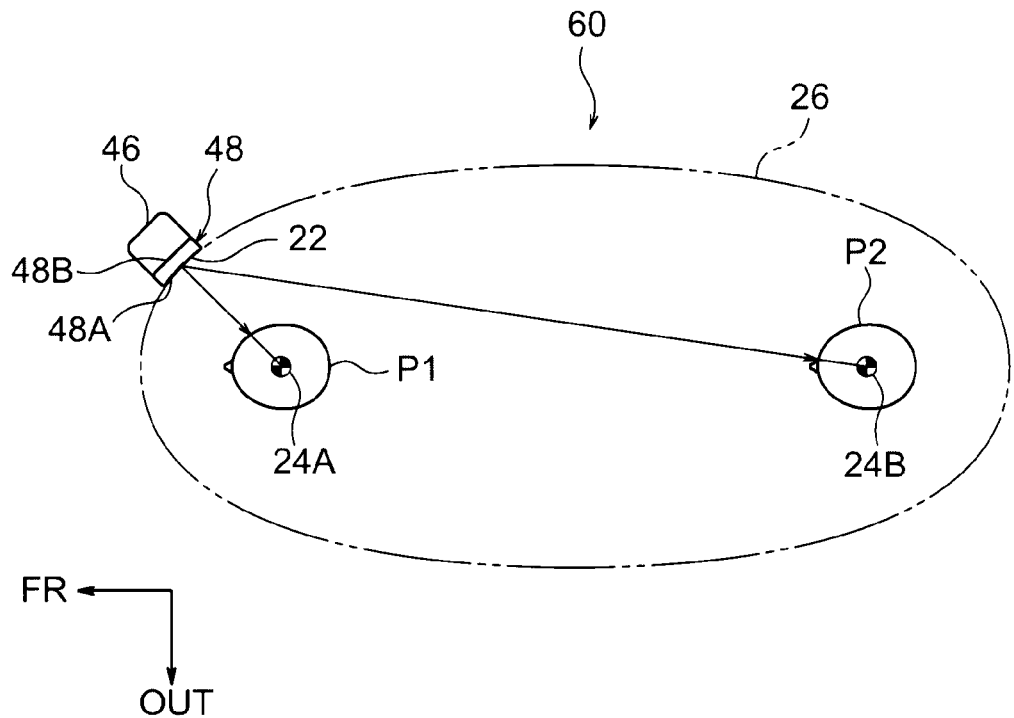
FIG. 9A is a diagram illustrating a variant example of the vehicle interior structure relating to the sixth exemplary embodiment of the present invention.
Figure 9B:
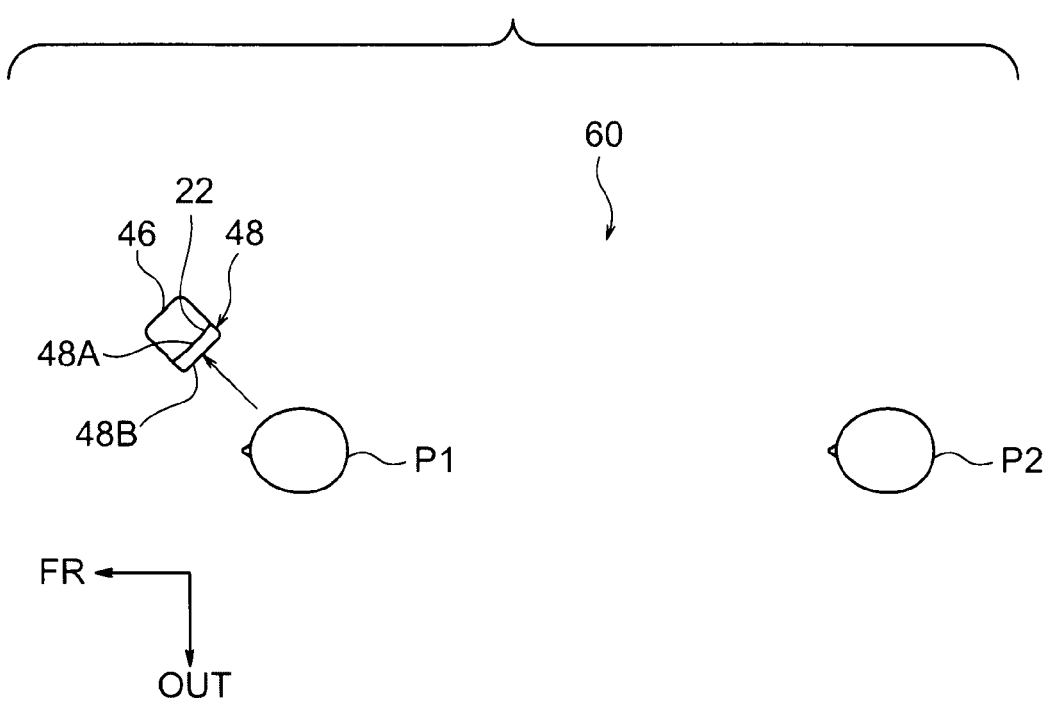
FIG. 9B is a diagram describing operation of the vehicle interior structure illustrated in FIG. 9A.

For example, in a variant example of the vehicle interior structure 60 relating to the sixth exemplary embodiment of the present invention, which is illustrated in FIG. 9A and FIG. 9B, the sound-reflecting communication unit 22 is integrally provided at a trim member 48 (corresponding to the vehicle member, switching unit, alterable body and displacing body of the present invention) that is provided at the vehicle interior side of an A-pillar 46.

At the trim member 48, one face is formed as a reflecting surface 48A with a concave shape at which the sound-reflecting communication unit 22 is integrally provided, and the other face is formed as an absorbing surface 48B with a convex shape capable of absorbing a sound produced from the occupants P1 and P2. This trim member 48 is capable of attaining a first attitude in which the reflecting surface 48A faces to the vehicle interior side, as illustrated in FIG. 9A, and a second attitude in which the reflecting surface 48A faces to the vehicle exterior side, as illustrated in FIG. 9B.

When structured in this manner too, a vehicle interior space that makes communication between the occupants P1 and P2 easier and a vehicle interior space in which privacy between the occupants P1 and P2 may be maintained may both be established, by the trim member 48 being turned over. Thus, an amenable vehicle interior space may be realized in accordance with the intentions of the occupants P1 and P2.

In this variant example, the trim member 48 is structured as a pillar trim provided at the vehicle interior side of the A-pillar 46. However, it may also be structured as, for example, a door trim provided at the vehicle interior side of a door. Furthermore, the trim member 48 may be plurally provided in the vehicle.

[Seventh Exemplary Embodiment]

Next, a seventh exemplary embodiment of the present invention is described.

Figure 10A:
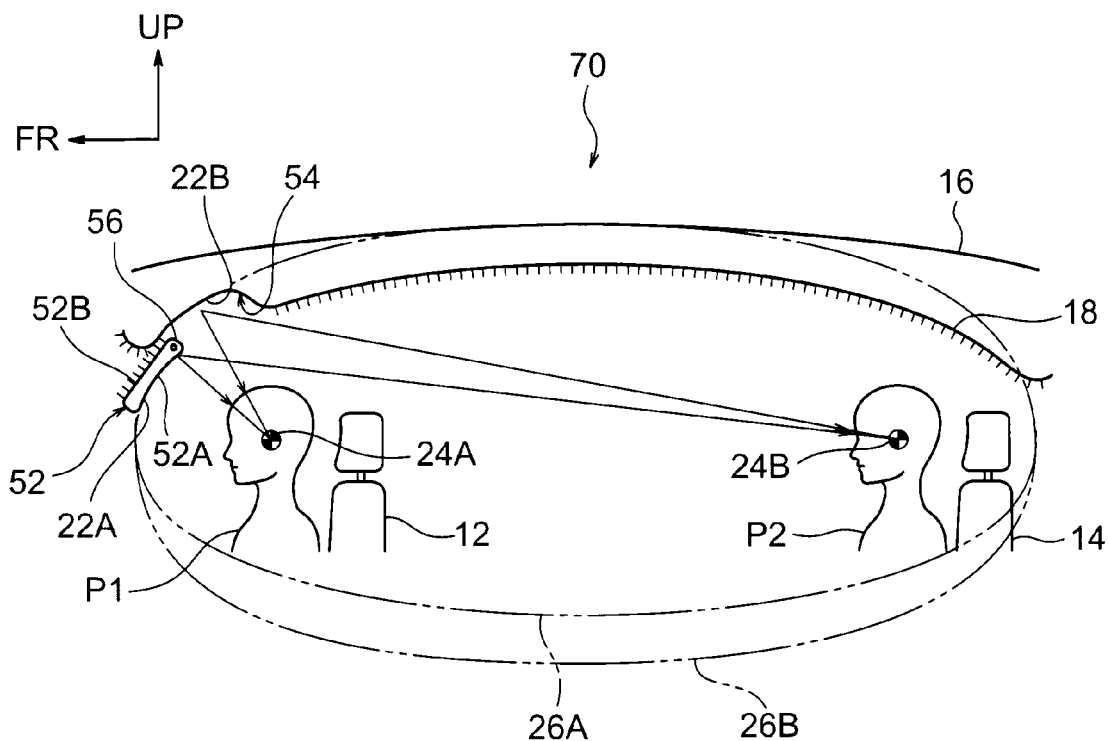
FIG. 10A is a side view illustrating overall structure of a vehicle interior structure relating to a seventh exemplary embodiment of the present invention.
Figure 10B:
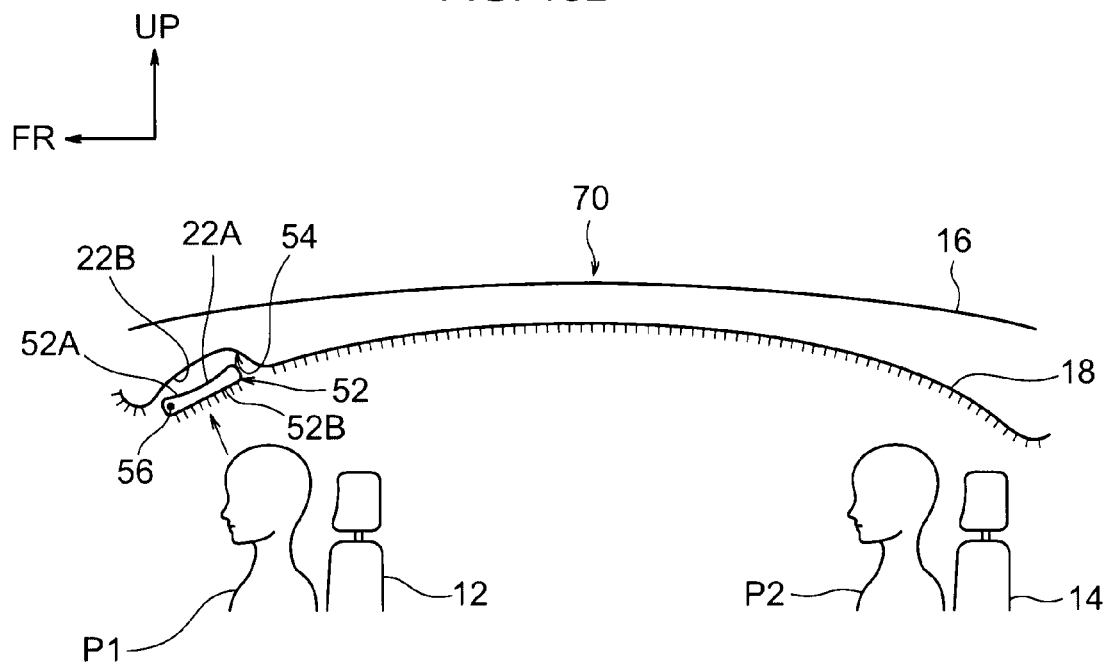
FIG. 10B is a diagram describing operation of the vehicle interior structure illustrated in FIG. 10A.

In FIG. 10A and FIG. 10B, overall structure of a vehicle interior structure 70 relating to the seventh exemplary embodiment of the present invention is illustrated in side view.

In the vehicle interior structure 70 relating to the seventh exemplary embodiment of the present invention, the locations of provision of the plural sound-reflecting communication units 22A and 22B in the vehicle are changed from the above-described vehicle interior structure 20 relating to the second exemplary embodiment of the present invention.

That is, the first sound-reflecting communication unit 22A is provided integrally with a side visor 52 (corresponding to the vehicle member, switching unit, alterable body and displacing body of the present invention), and the second sound-reflecting communication unit 22B is provided integrally with a floor face of an accommodation recess 54 that is for accommodating the side visor 52.

At the side visor 52, one face is formed as a reflecting surface 52A with a concave shape, at which the first sound-reflecting communication unit 22A is integrally provided, and the other face is formed as an absorbing surface 52B that is capable of absorbing a sound produced from the occupants P1 and P2.

The side visor 52 is turnably supported at a ceiling region of the vehicle interior, via a turning axle portion 56, and is capable of attaining a deployed position in which the reflecting surface 52A faces down (corresponding to the first attitude of the present invention), as illustrated in FIG. 10A, and a stowed position in which the reflecting surface 52A faces up (corresponding to the second attitude of the present invention), as illustrated in FIG. 10B.

According to the vehicle interior structure 70 relating to the seventh exemplary embodiment of the present invention, the following characteristic operations and effects are accomplished.

That is, according to the vehicle interior structure 70 relating to the seventh exemplary embodiment of the present invention, when the side visor 52 is set to a deployed state in which the reflecting surface 52A faces down as illustrated in FIG. 10A (this state of the vehicle interior structure 70 corresponds to the first mode of the present invention), a sound produced from the occupants P1 and P2 is conveyed while being reflected and converged toward the other occupant by the sound-reflecting communication unit 22A, 22B. Thus, communication between the occupants P1 and P2 sitting on the pair of vehicle seats 12 and 14 may be made easier.

On the other hand, when the side visor 52 is set to a stowed state in which the reflecting surface 52A faces up as illustrated in FIG. 10B (this state of the vehicle interior structure 70 corresponds to the second mode of the present invention), the sound-reflecting communication unit 22B is hidden by the side visor 52 and a sound produced from the occupants P1 and P2 is absorbed by the absorbing surface 52B. Thus, communicability of sounds between the occupants P1 and P2 may be made lower than when the side visor 52 is set to the deployed state as illustrated in FIG. 10A, and privacy between the occupants P1 and P2 sitting on the pair of vehicle seats 12 and 14 may be maintained.

Thus, according to the vehicle interior structure 70 relating to the seventh exemplary embodiment of the present invention, by the side visor 52 being turned, a vehicle interior space that makes communication between the occupants P1 and P2 easier and a vehicle interior space in which privacy between the occupants P1 and P2 may be maintained may both be established. Thus, an amenable vehicle interior space may be realized in accordance with the intentions of the occupants P1 and P2.

[Eighth Exemplary Embodiment]

Next, an eighth exemplary embodiment of the present invention is described.

Figure 11A:
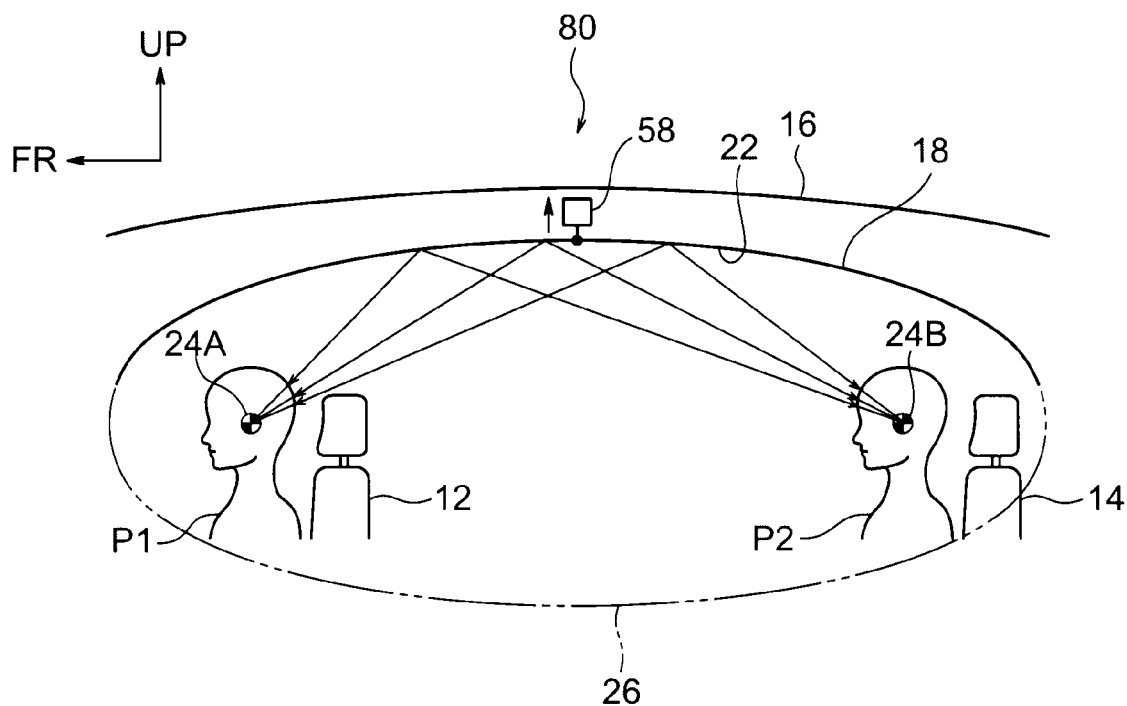
FIG. 11A is a side view illustrating overall structure of a vehicle interior structure relating to an eighth exemplary embodiment of the present invention.
Figure 11B:
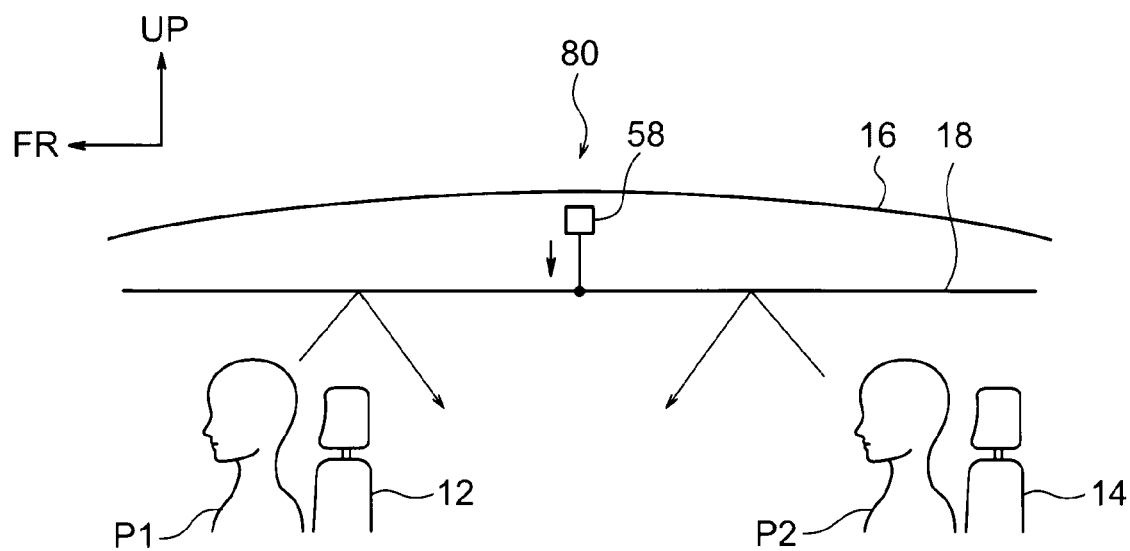
FIG. 11B is a diagram describing operation of the vehicle interior structure illustrated in FIG. 11A.

In FIG. 11A and FIG. 11B, overall structure of a vehicle interior structure 80 relating to the eighth exemplary embodiment of the present invention is illustrated in side view.

In the vehicle interior structure 80 relating to the eighth exemplary embodiment of the present invention, an actuator 58 is added to the above-described vehicle interior structure 10 relating to the first exemplary embodiment of the present invention, and the ceiling member 18 (corresponding to the vehicle member, switching unit, alterable body and deforming body of the present invention) is structured to include flexibility.

The actuator 58 is structured, for example, to push and pull a middle portion of the ceiling member 18 in the vehicle vertical direction in accordance with control signals from an unillustrated control switch or the like.

The ceiling member 18 is capable of attaining a first attitude that constitutes the sound-reflecting communication unit 22 as illustrated in FIG. 11A, by the middle portion being pulled up by the actuator 58, and a second attitude that forms a flat shape as illustrated in FIG. 11B, by the middle portion being pulled down by the actuator 58.

According to the vehicle interior structure 80 relating to the eighth exemplary embodiment of the present invention, the following characteristic operations and effects are accomplished.

That is, according to the vehicle interior structure 80 relating to the eighth exemplary embodiment of the present invention, when the ceiling member 18 is set to the first attitude that constitutes the sound-reflecting communication unit 22 by the middle portion being pulled up by the actuator 58 as illustrated in FIG. 11A (this state of the vehicle interior structure 80 corresponds to the first mode of the present invention), a sound produced from the occupants P1 and P2 is conveyed while being reflected and converged toward the other occupant by the sound-reflecting communication unit 22. Thus, communication between the occupants P1 and P2 sitting on the pair of vehicle seats 12 and 14 may be made easier.

On the other hand, when the ceiling member 18 is set to the second attitude that forms a flat shape by the middle portion being pulled down by the actuator 58 as illustrated in FIG. 11B (this state of the vehicle interior structure 80 corresponds to the second mode of the present invention), a sound produced from the occupants P1 and P2 is reflected toward positions different from that of the other occupant. Thus, communicability of sounds between the occupants P1 and P2 may be made lower than when the ceiling member 18 constitutes the sound-reflecting communication unit 22 as illustrated in FIG. 11A, and privacy between the occupants P1 and P2 sitting on the pair of vehicle seats 12 and 14 may be maintained.

Thus, according to the vehicle interior structure 80 relating to the eighth exemplary embodiment of the present invention, by the shape of the ceiling member 18 being altered, a vehicle interior space that makes communication between the occupants P1 and P2 easier and a vehicle interior space in which privacy between the occupants P1 and P2 may be maintained may both be established. Thus, an amenable vehicle interior space may be realized in accordance with the intentions of the occupants P1 and P2.

In the vehicle interior structure 80 relating to the eighth exemplary embodiment of the present invention, the sound-reflecting communication unit 22 is constituted at the ceiling member 18 by the overall shape of the ceiling member 18 being altered. However, the sound-reflecting communication unit 22 may be constituted at a portion of the ceiling member 18 by the shape of this portion of the ceiling member 18 being altered.

Further, in the vehicle interior structure 80 relating to the eighth exemplary embodiment of the present invention, the sound-reflecting communication unit 22 is constituted at the ceiling member 18 by the shape of the ceiling member 18 being altered. However, the shape of another vehicle member apart from the ceiling member 18 may be altered and the sound-reflecting communication unit 22 constituted by this other member.

[Ninth Exemplary Embodiment]

Next, a ninth exemplary embodiment of the present invention is described.

Figure 12A:
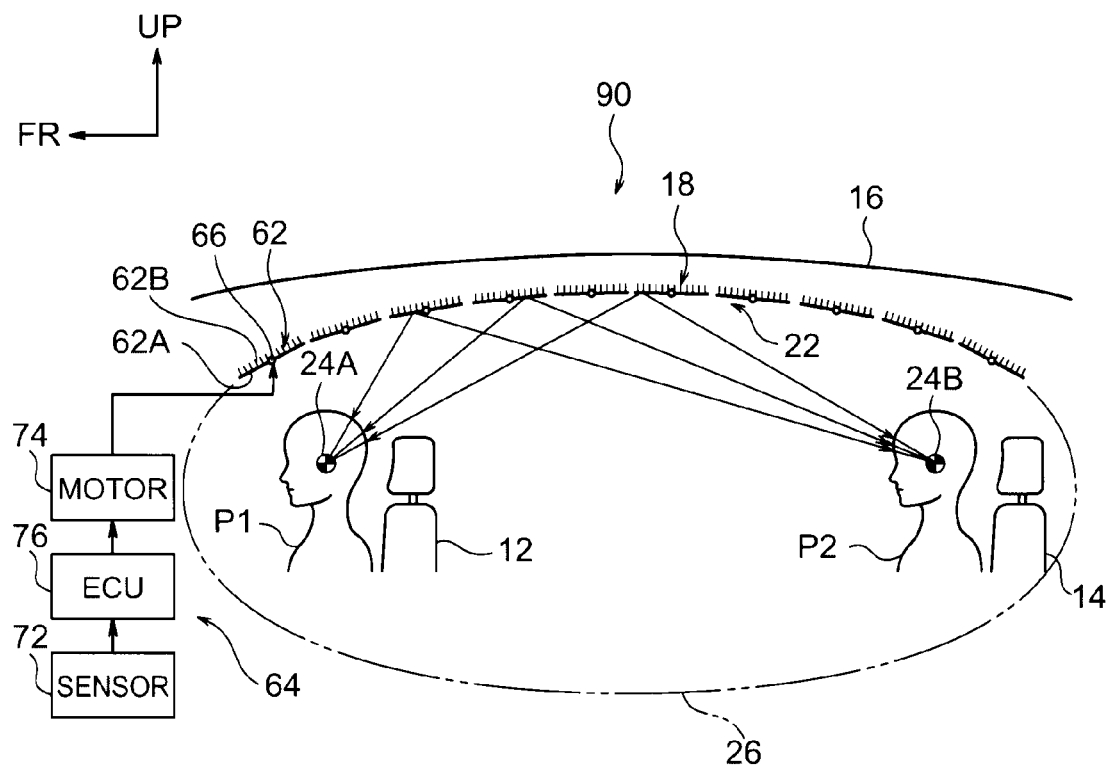
FIG. 12A is a side view illustrating overall structure of a vehicle interior structure relating to a ninth exemplary embodiment of the present invention.
Figure 12B:
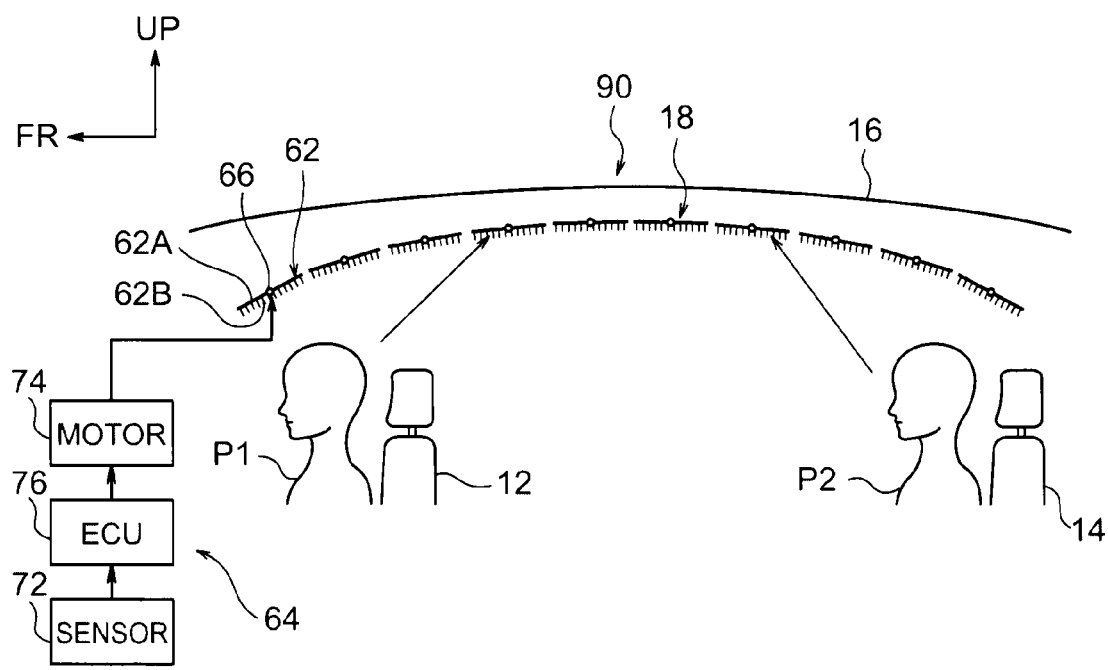
FIG. 12B is a diagram describing operation of the vehicle interior structure illustrated in FIG. 12A.

In FIG. 12A and FIG. 12B, overall structure of a vehicle interior structure 90 relating to the ninth exemplary embodiment of the present invention is illustrated in side view.

The vehicle interior structure 90 relating to the ninth exemplary embodiment of the present invention is a structure in which, in the above-described vehicle interior structure 10 relating to the first exemplary embodiment of the present invention, the ceiling member 18 (corresponding to the vehicle member, switching unit and alterable body of the present invention) is divided into plural turning plates 62 (corresponding to a turning body of the present invention), and a driving device 64 is added, which is for driving the turning plates 62 in accordance with a sound production state of the occupants P1 and P2.

At each turning plate 62, one face is formed as a reflecting surface 62A that is capable of reflecting a sound produced from the occupants P1 and P2, and the other face is formed as an absorbing surface 62B that is capable of absorbing a sound produced from the occupants P1 and P2.

The turning plates 62 are turnably supported at the ceiling region of the vehicle interior, via turning axle portions 66. The ceiling member 18 is capable of attaining a first attitude that constitutes the sound-reflecting communication unit 22 as illustrated in FIG. 12A, by the turning plates 62 being set with the reflecting surfaces 62A facing down, and a second attitude as illustrated in FIG. 12B, by the turning plates 62 being set with the absorbing surfaces 62B facing down.

The driving device 64 is provided with a sensor 72 that detects a sound production state of the occupants P1 and P2 (corresponding to an occupant state detection unit of the present invention), a motor 74 (corresponding to a switching driving unit of the present invention) that turns and drives the turning bodies, and an ECU 76 that controls the motor 74 on the basis of output signals from the sensor 72 (corresponding to a switching control unit of the present invention).

The sensor 72 is constituted by, for example, a microphone capable of detecting the sound production state of the occupants P1 and P2 or the like.

According to the vehicle interior structure 90 relating to the ninth exemplary embodiment of the present invention, the following characteristic operations and effects are accomplished.

That is, according to the vehicle interior structure 90 relating to the ninth exemplary embodiment of the present invention, when the sound production state of the occupants P1 and P2 is detected by the sensor 72 and the ECU 76 judges, on the basis of an output signal of the sensor 72, that a sound of the occupants P1 and P2 has been produced, it controls the motor 74 and, accordingly, the turning plates 62 are turned such that the reflecting surfaces 62A are set face down.

When the turning plates 62 are set with the reflecting surfaces 62A face down (this state of the vehicle interior structure 90 corresponds to the first mode of the present invention) as illustrated in FIG. 12A, the ceiling member 18 constitutes the sound-reflecting communication unit 22. Thus, a sound produced from the occupants P1 and P2 is conveyed while being reflected and converged toward the other occupant by the sound-reflecting communication unit 22. Therefore, communication between the occupants P1 and P2 sitting on the pair of vehicle seats 12 and 14 may be made easier.

On the other hand, when the sound production state of the occupants P1 and P2 is detected by the sensor 72 and the ECU 76 judges, on the basis of an output signal of the sensor 72, that a sound of the occupants P1 and P2 has not been produced, it controls the motor 74 and, accordingly, the turning plates 62 are turned such that the absorbing surfaces 62B are set face down.

When the turning plates 62 are set with the absorbing surfaces 62B face down (this state of the vehicle interior structure 90 corresponds to the second mode of the present invention) as illustrated in FIG. 12B, a sound produced from the occupants P1 and P2 sitting on the vehicle seats 12 and 14 is absorbed by the absorbing surfaces 62B of the turning plates 62. Thus, communicability of sounds between the occupants P1 and P2 may be made lower than when the turning plates 62 are set with the reflecting surfaces 62A face down as illustrated in FIG. 12A, and privacy between the occupants P1 and P2 sitting on the pair of vehicle seats 12 and 14 may be maintained.

Thus, according to the vehicle interior structure 90 relating to the ninth exemplary embodiment of the present invention, by a turn angle of the turning plates 62 constituting the ceiling member 18 being altered, a vehicle interior space that makes communication between the occupants P1 and P2 easier and a vehicle interior space in which privacy between the occupants P1 and P2 may be maintained may both be established. Thus, an amenable vehicle interior space may be realized in accordance with the intentions of the occupants P1 and P2.

Further, according to the vehicle interior structure 90 relating to the ninth exemplary embodiment of the present invention, the turning plates 62 may be automatically turned in accordance with sound production states of the occupants P1 and P2. Thus, an amenable vehicle interior space that reflects sound production states of the occupants P1 and P2 may be realized.

According to the vehicle interior structure 90 relating to the ninth exemplary embodiment of the present invention, because the plural turning plates 62 are simply structures into which the ceiling member 18 is plurally divided, attractiveness equivalent to the ceiling member 18 in related art and volume of the vehicle interior space may be assured.

According to the vehicle interior structure 90 relating to the ninth exemplary embodiment of the present invention, when the plural turning plates 62 are set from the second attitude in which the absorbing surfaces 62B are face down to the first attitude constituting the sound-reflecting communication unit 22 in which the reflecting surfaces 62A are face down, the overall shape does not change from when in the second attitude. Therefore, when the plural turning plates 62 are set to the first attitude constituting the sound-reflecting communication unit 22 in which the reflecting surfaces 62A are face down, a change in volume of the vehicle interior space in comparison with the second attitude in which the absorbing surfaces 62B are face down may be restrained.

According to the vehicle interior structure 90 relating to the ninth exemplary embodiment of the present invention, because the ceiling member 18 is structured to plurally include the turning plates 62, individual turning ranges of the turning plates 62 may be made smaller than in a case of structuring with a single large turning plate 62. Therefore, space needed for reserving the turning ranges of the turning plates 62 in the vehicle interior space may be kept to a minimum while a more amenable vehicle interior space is realized, in which communication between the occupants P1 and P2 sitting on the pair of vehicle seats 12 and 14 is made easier.

In the vehicle interior structure 90 relating to the ninth exemplary embodiment of the present invention, the turning plates 62 are automatically turned by the driving device 64 in accordance with the sound production state of the occupants P1 and P2. However, a structure as follows is also possible.

The turning plates 62 may be turned by the driving device 64 in accordance with operation of a control switch or the like by the occupants P1 and P2, or the turning plates 62 may be turned manually with a control handle or the like. Further, the turning plates 62 may be regionally turned in accordance with seats in which the occupants P1 and P2 are sitting (for example, the turning plates may be divided in the vehicle lateral direction and, of these, only turning plates capable of conveying sounds between a driver seat and a driver side third row seat turned).

In the vehicle interior structure 90 relating to the ninth exemplary embodiment of the present invention, the plural turning plates 62 constitute the single sound-reflecting communication unit 22. However, plural sound-reflecting communication units may be structured.

Figure 13A:
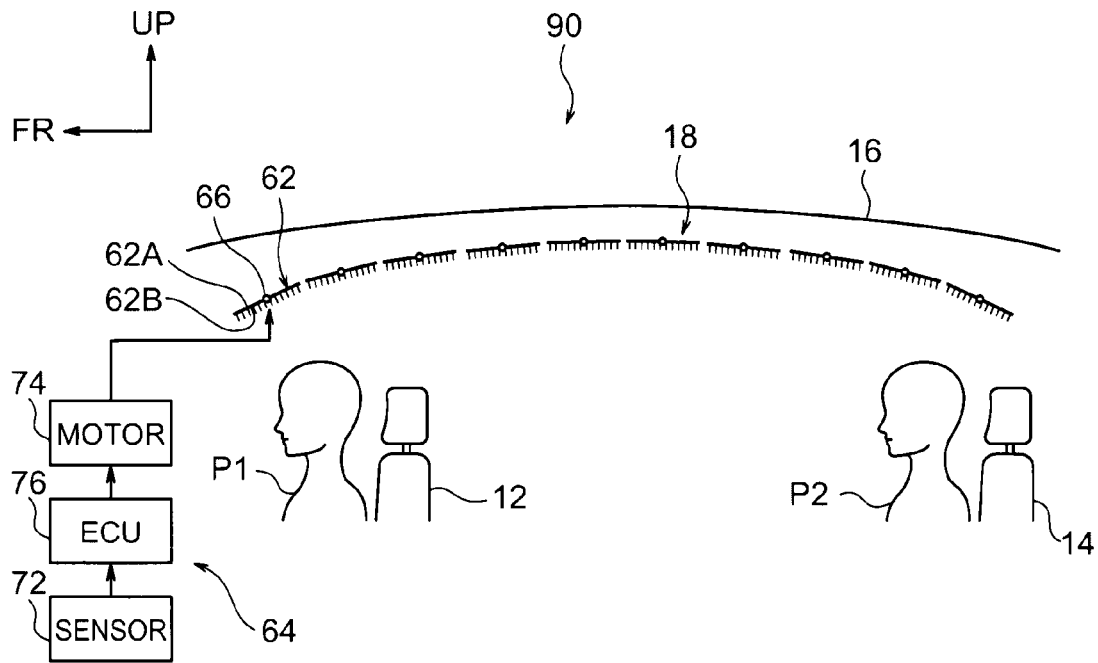
FIG. 13A is a diagram illustrating a variant example of the vehicle interior structure relating to the ninth exemplary embodiment of the present invention.
Figure 13B:
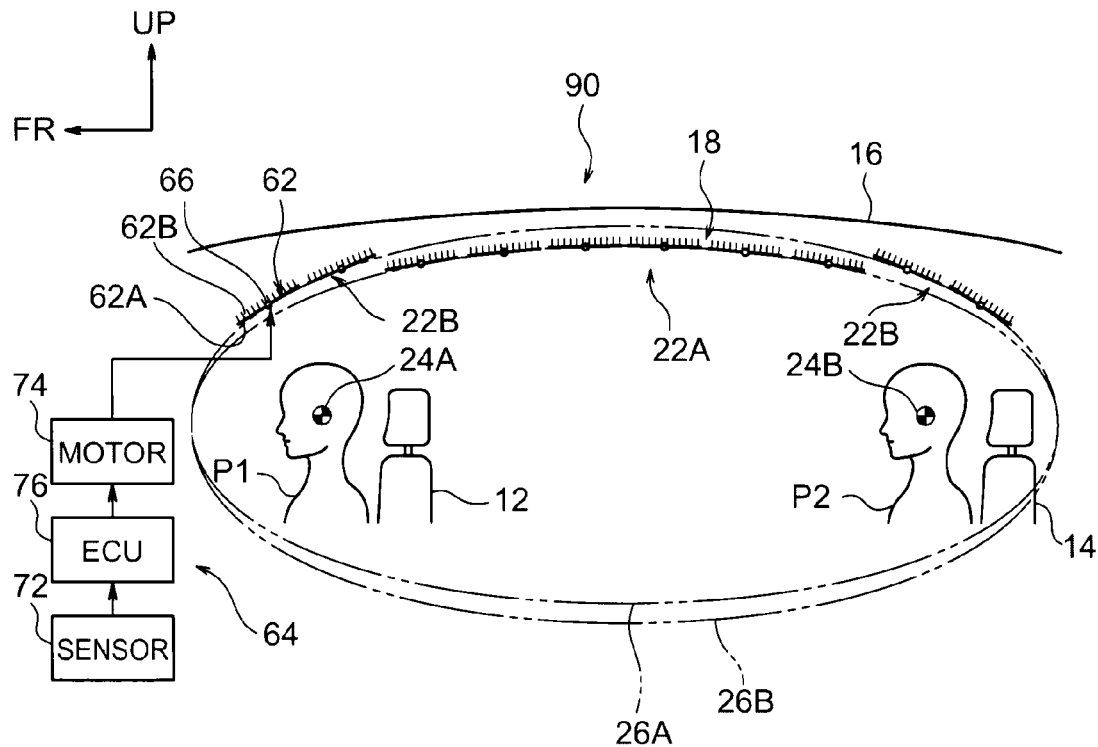
FIG. 13B is a diagram describing operation of the vehicle interior structure illustrated in FIG. 13A.

For example, in a variant example of the vehicle interior structure 90 relating to the ninth exemplary embodiment of the present invention, which is illustrated in FIG. 13A and FIG. 13B, the turning plates 62 that are disposed at a middle portion of the ceiling member 18 constitute the first sound-reflecting communication unit 22A that forms a concave shape along the first virtual ellipse 26A, and the turning plates 62 that are disposed at the front and rear of the ceiling member 18 constitute the second sound-reflecting communication units 22B that form concave shapes along the second virtual ellipse 26B with a different short radius from the first virtual ellipse 26A.

According to this structure, because the plural sound-reflecting communication units 22A and 22B are provided in the vehicle, a sound produced from the occupants P1 and P2 respectively sitting on the pair of vehicle seats 12 and 14 may be conveyed while being reflected and converged toward the other occupant by the plural sound-reflecting communication units 22A and 22B.

Further, in comparison with the case in which the single sound-reflecting communication unit 22 is constituted by the plural turning plates 62, individual sizes of the sound-reflecting communication units 22A and 22B may be made smaller.

That is, in the present variant example, the size of the first sound-reflecting communication unit 22A may be made smaller by the provision of the second sound-reflecting communication units 22B, and extension into the vehicle interior of regions at the two ends of the first sound-reflecting communication unit 22A may be made smaller.

Therefore, a reduction of vehicle interior space due to occupation by the first sound-reflecting communication unit 22A may be kept to a minimum and an amenable vehicle interior space may be realized, in which communication between the occupants P1 and P2 sitting on the pair of vehicle seats 12 and 14 is made easier.

In the vehicle interior structure 90 relating to the ninth exemplary embodiment of the present invention, the plural turning plates 62 are automatically turned by the driving device 64 in accordance with the sound production state of the occupants P1 and P2, and switching is implemented between the state in which a sound produced from the occupants P1 and P2 is reflected and the state in which a sound is absorbed. However, a structure as follows is also possible.

Switching between the state in which a sound produced from the occupants P1 and P2 is reflected and the state in which a sound is absorbed may be implemented by other members being automatically driven by the driving device 64 in accordance with the sound production state of the occupants P1 and P2.

For example, the driving device 64 may be applied to the vehicle interior structure relating to the third exemplary embodiment to eighth exemplary embodiment of the present invention, and switching between the state in which a sound produced from the occupants P1 and P2 is reflected and the state in which a sound is absorbed in accordance with the sound production state of the occupants P1 and P2 may be implemented by automatically driving the winding-type cover member 32, the sliding-type cover members 38, the ceiling member 18, the console door 44/the trim member 48, the side visor 52 or the like.

In the vehicle interior structure 90 relating to the ninth exemplary embodiment of the present invention, the sensor 72 is structured by a microphone or the like, and the ECU 76 is structured to drive the motor 74 such that the turning plates 62 set the reflecting surfaces 62A face down when the ECU 76 judges production of a sound from the occupants P1 and P2 on the basis of an output signal of the sensor 72. However a structure as follows is also possible.

The sensor 72 may be structured by an occupant presence sensing sensor that senses the presence of the occupants P1 and P2, and the ECU 76 structured to drive the motor 74 such that the turning plates 62 set the reflecting surfaces 62A face down when the ECU 76 judges that the occupants P1 and P2 are present on the basis of an output signal of the sensor 72.

[Tenth Exemplary Embodiment]

Next, a tenth exemplary embodiment of the present invention is described.

Figure 14A:
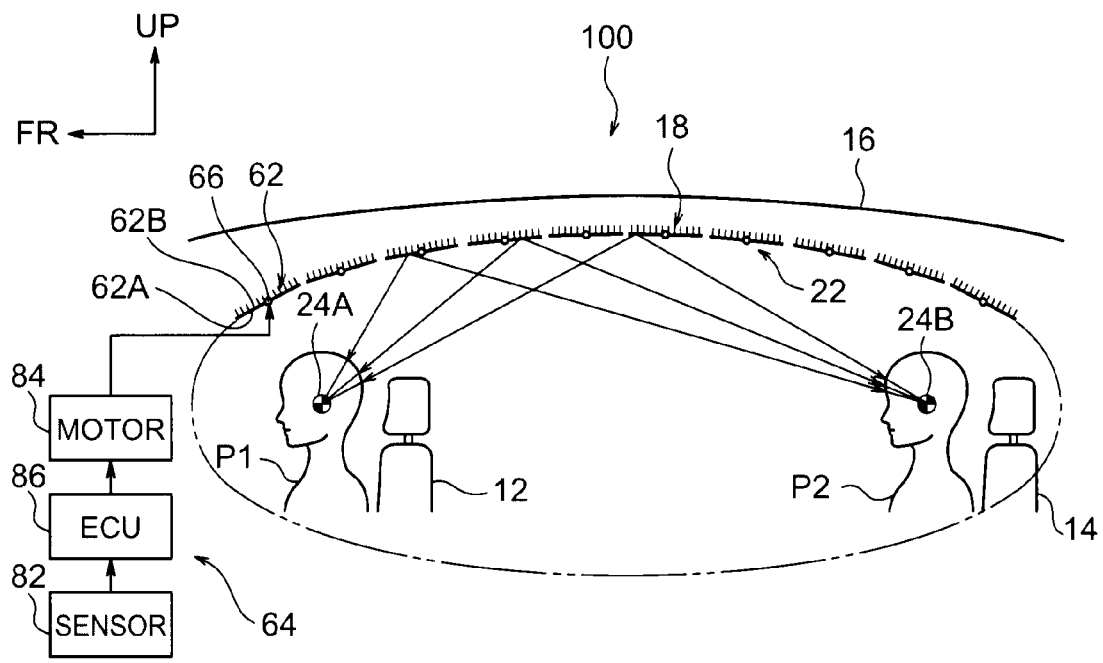
FIG. 14A is a side view illustrating overall structure of a vehicle interior structure relating to a tenth exemplary embodiment of the present invention.
Figure 14B:
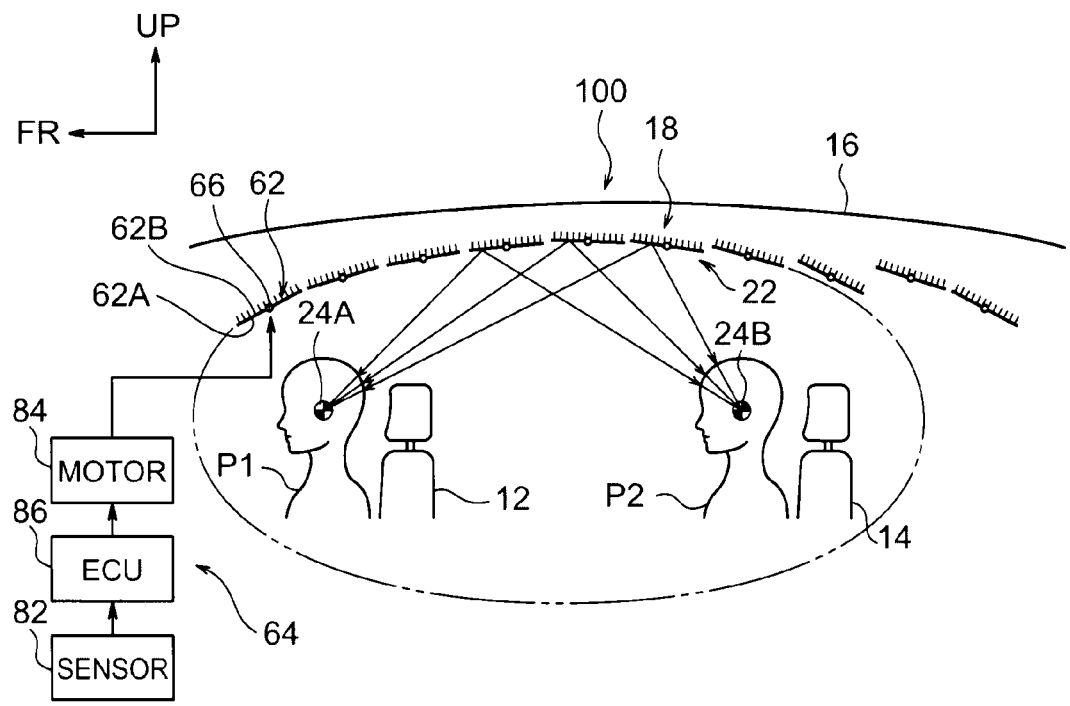
FIG. 14B is a diagram describing operation of the vehicle interior structure illustrated in FIG. 14A.

In FIG. 14A and FIG. 14B, overall structure of a vehicle interior structure 100 relating to the tenth exemplary embodiment of the present invention is illustrated in side view.

In the vehicle interior structure 100 relating to the tenth exemplary embodiment of the present invention, the driving device 64 for rotary-driving the plural turning plates 62 (corresponding to the alteration unit of the present invention) is changed from the above-described vehicle interior structure 90 relating to the ninth exemplary embodiment of the present invention.

That is, in the driving device 64, a sensor 82 (corresponding to the occupant state detection unit of the present invention) is constituted by an infrared sensor capable of detecting positions of the occupants P1 and P2, a sitting position detection sensor or the like.

A motor 84 (corresponding to the alteration driving unit of the present invention) is structured to rotary-drive the plural turning plates 62, and an ECU 86 (corresponding to the alteration control unit of the present invention) is structured to control the motor 84 on the basis of output signals of the sensor 82.

According to the vehicle interior structure 100 relating to the tenth exemplary embodiment of the present invention, the following characteristic operations and effects are accomplished.

That is, according to the vehicle interior structure 100 relating to the tenth exemplary embodiment of the present invention, when positions of the occupants P1 and P2 are detected by the sensor 82 and the ECU 86 judges, on the basis of an output signal of the sensor 82, that a position of the occupants P1 and P2 has changed, it controls the motor 84 and, accordingly, the turn angles of the turning plates 62 are adjusted such that the sound-reflecting communication unit 22 constituted by the plural turning plates 62 maintain a shape along the virtual ellipse 26 of which the focuses 24A and 24B are at positions of the heads of the occupants P1 and P2.

That is, both when the position of the rear occupant P2 gets further from the front occupant P1 as illustrated in FIG. 14A and when the position of the rear occupant P2 gets closer to the front occupant P1 as illustrated in FIG. 14B, the sound-reflecting communication unit 22 constituted by the plural turning plates 62 is maintained in a shape along the virtual ellipse 26 of which the focuses 24A and 24B are at the positions of the heads of the occupants P1 and P2. Thus, an amenable vehicle interior space may be maintained even if the positions of the occupants P1 and P2 change.

Further, according to the vehicle interior structure 100 relating to the tenth exemplary embodiment of the present invention, the plural turning plates 62 may be automatically turned in accordance with positions of the occupants P1 and P2. Thus, an amenable vehicle interior space that reflects positions of the occupants P1 and P2 may be realized.

The vehicle interior structure 100 relating to the tenth exemplary embodiment of the present invention is structured such that the shape of the sound-reflecting communication unit 22 is altered by adjusting turn angles of the turning plates 62 constituting the ceiling member 18. However, it may also be structured such that the shape of the sound-reflecting communication unit 22 is altered by driving another vehicle member apart from the ceiling member 18.

Further, in the vehicle interior structure 100 relating to the tenth exemplary embodiment of the present invention, the sound-reflecting communication unit 22 is structured such that the shape is altered by adjusting the turn angles of the turning plates 62. However, it may be structured such that a position thereof is altered by adjusting the turn angles of the turning plates 62, and it may be structured such that at least one of the shape and position is altered by adjusting the turn angles of the turning plates 62.

In the vehicle interior structure 100 relating to the tenth exemplary embodiment of the present invention, the turn angles of the turning plates 62 are automatically adjusted by the driving device 64 in accordance with the positions of the occupants P1 and P2. However, a structure as follows is also possible.

The turn angles of the turning plates 62 may be adjusted by the driving device 64 in accordance with operation of a control switch or the like by the occupants P1 and P2, or the turn angles of the turning plates 62 may be adjusted manually with a control handle or the like.

[Eleventh Exemplary Embodiment]

Next, an eleventh exemplary embodiment of the present invention is described.

Figure 15A:
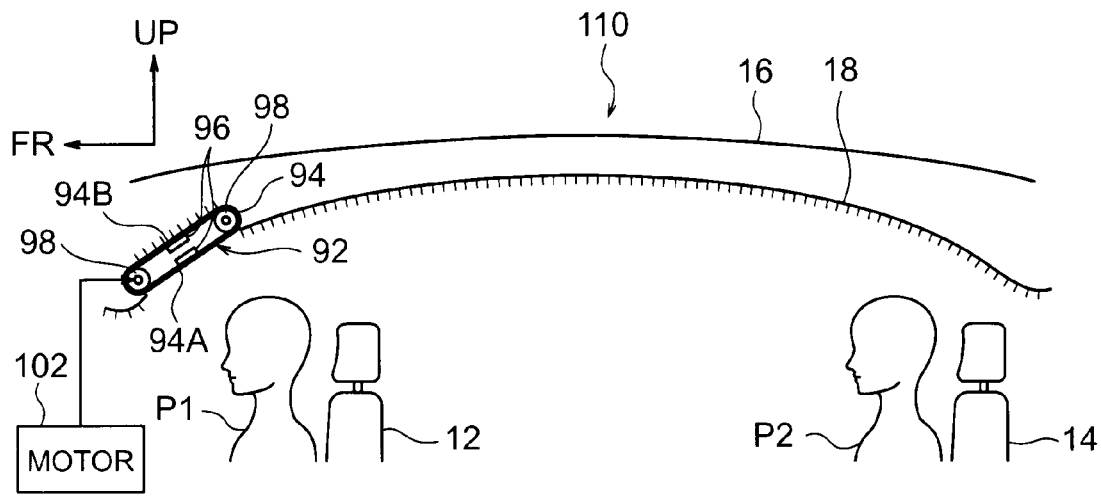
FIG. 15A is a side view illustrating overall structure of a vehicle interior structure relating to an eleventh exemplary embodiment of the present invention.
Figure 15B:
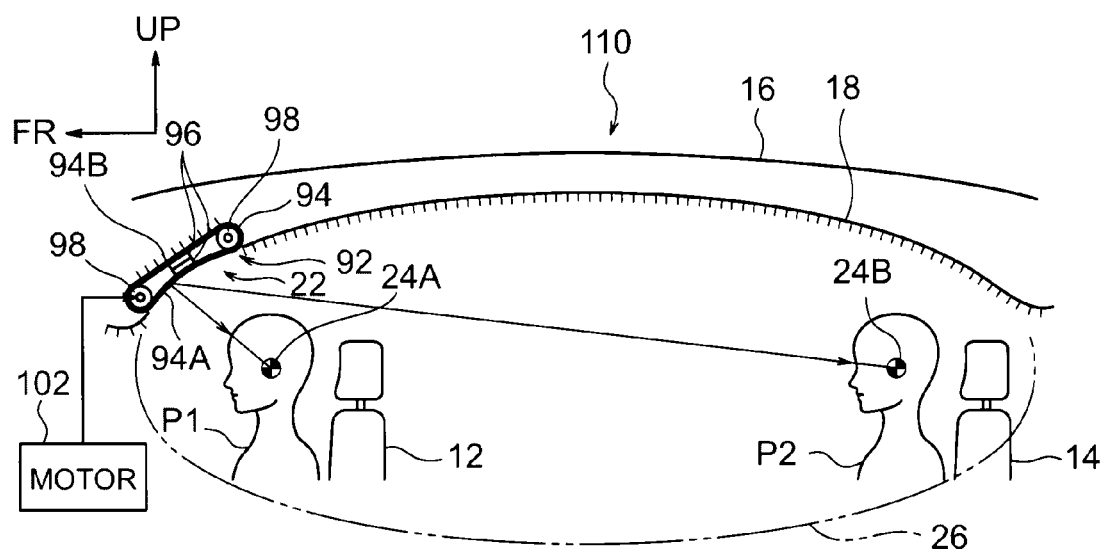
FIG. 15B is a diagram describing operation of the vehicle interior structure illustrated in FIG. 15A.
Figure 15C:
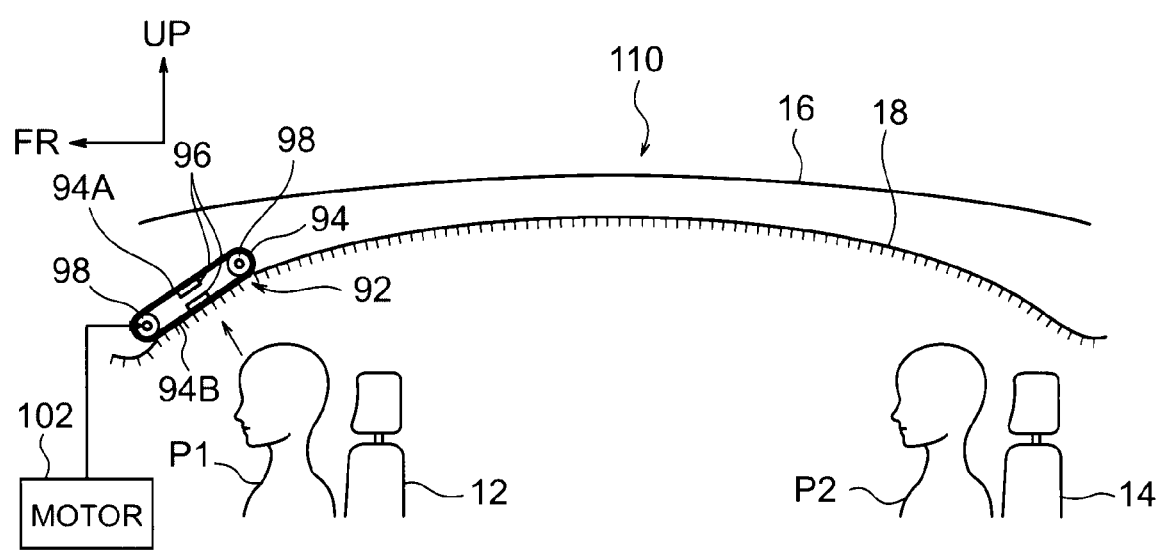
FIG. 15C is a diagram describing operation of the vehicle interior structure illustrated in FIG. 15A.

In FIG. 15A, FIG. 15B and FIG. 15C, overall structure of a vehicle interior structure 110 relating to the eleventh exemplary embodiment of the present invention is illustrated in side view.

In the vehicle interior structure 110 relating to the eleventh exemplary embodiment of the present invention, a belt-type ceiling member 92 (corresponding to the vehicle member of the present invention) and a motor 102 are added to the above-described vehicle interior structure 10 relating to the first exemplary embodiment of the present invention, in place of the sound-reflecting communication unit 22 being omitted from the ceiling member 18.

The belt-type ceiling member 92 is provided with an endless belt 94 at which a reflecting surface 94A and an absorbing surface 94B are provided. Planar fasteners 96 (corresponding to a deforming unit and a mating unit of the present invention), for causing a rear face of the reflecting surface 94A of the endless belt 94 to mate with a rear face of the absorbing surface 94B, are provided at the inner side of the endless belt 94.

A reflecting surface 94A is set to a first deformation state that constitutes the sound-reflecting communication unit 22 when the rear face of the reflecting surface 94A of the endless belt 94 is mated with the rear face of the absorbing surface 94B by the planar fasteners 96, as illustrated in FIG. 15B, and a second deformation state that constitutes a flat shape when the state of mating of the planar fasteners 96 is released, as illustrated in FIG. 15A and FIG. 15C.

The endless belt 94 is stretched between a pair of pulleys 98 (corresponding to the switching unit and a turning unit of the present invention), and is structured to be turned in association with turning of the pulleys 98. One of the pulleys 98 is turned by the motor 102.

According to the vehicle interior structure 110 relating to the eleventh exemplary embodiment of the present invention, the following characteristic operations and effects are accomplished.

That is, according to the vehicle interior structure 110 relating to the eleventh exemplary embodiment of the present invention, the reflecting surface 94A is faced toward the heads of the occupants P1 and P2 as illustrated in FIG. 15A (this state of the vehicle interior structure 110 corresponds to the first mode of the present invention) by the endless belt 94 being turned by the motor 102.

When the rear face of the reflecting surface 94A of the endless belt 94 is mated with the rear face of the absorbing surface 94B by the planar fasteners 96 as illustrated in FIG. 15B, by the occupants P1 and P2 pressing the reflecting surface 94A, the reflecting surface 94A constitutes the sound-reflecting communication unit 22 and forms a shape capable of conveying a sound produced from the occupants P1 and P2 toward the other occupant while reflecting and converging the sound (corresponding to the first deformation state of the present invention).

Therefore, a sound produced from the occupants P1 and P2 may be conveyed while being reflected and converged toward the other occupant by the reflecting surface 94A. Thus, communication between the occupants P1 and P2 sitting on the pair of vehicle seats 12 and 14 may be made easier.

On the other hand, when the endless belt 94 is turned by the motor 102 from this state, the mating state of the planar fasteners 96 is released, and the reflecting surface 94A separates from the absorbing surface 94B and forms the flat shape (corresponding to the second deformation state of the present invention). Thereafter, as illustrated in FIG. 15C, the absorbing surface 94B is faced toward the heads of the occupants P1 and P2 (this state of the vehicle interior structure 110 corresponds to the second mode of the present invention).

Therefore, a sound produced from the occupants P1 and P2 may be absorbed by the absorbing surface 94B. Thus, communicability of sounds between the occupants P1 and P2 may be made lower than when the reflecting surface 94A constitutes the sound-reflecting communication unit 22 as illustrated in FIG. 15B, and privacy between the occupants P1 and P2 sitting on the pair of vehicle seats 12 and 14 may be maintained.

Thus, according to the vehicle interior structure 110 relating to the eleventh exemplary embodiment of the present invention, a vehicle interior space that makes communication between the occupants P1 and P2 easier and a vehicle interior space in which privacy between the occupants P1 and P2 may be maintained may both be established. Thus, an amenable vehicle interior space may be realized in accordance with the intentions of the occupants P1 and P2.

In the vehicle interior structure 110 relating to the eleventh exemplary embodiment of the present invention, the driving device 64 of the above-described vehicle interior structure 90 relating to the ninth exemplary embodiment of the present invention may be applied and the endless belt 94 automatically turned by the motor 102 in accordance with a sound production state of the occupants P1 and P2. Thus, the endless belt 94 may be switched from the state in which the rear face of the reflecting surface 94A of the endless belt 94 is mated with the rear face of the absorbing surface 94B by the planar fasteners 96 as illustrated in FIG. 15B to the state in which the absorbing surface 94B is faced toward the heads of the occupants P1 and P2 as illustrated in FIG. 15C.

In the vehicle interior structure 110 relating to the eleventh exemplary embodiment of the present invention, it is necessary for the occupants P1 and P2 to press the reflecting surface 94A for the rear face of the reflecting surface 94A of the endless belt 94 to be mated with the rear face of the absorbing surface 94B by the planar fasteners 96. However, a structure is possible such that the reflecting surface 94A is pulled in toward the absorbing surface 94B by an unillustrated actuator.

Furthermore, this actuator for pulling in the reflecting surface 94A toward the absorbing surface 94B may be included and switching between the state in which the rear face of the reflecting surface 94A of the endless belt 94 is mated with the rear face of the absorbing surface 94B by the planar fasteners 96 as illustrated in FIG. 15B and the state in which the absorbing surface 94B is faced toward the heads of the occupants P1 and P2 as illustrated in FIG. 15C may be implemented automatically in accordance with the sound production state of the occupants P1 and P2.

[Twelfth Exemplary Embodiment]

Next, a twelfth exemplary embodiment of the present invention is described.

Figure 16A:
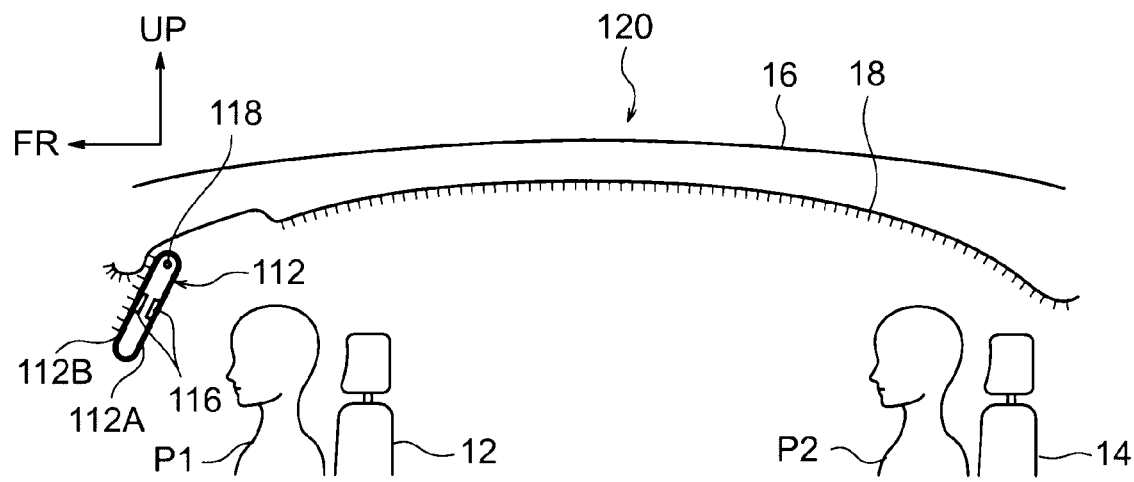
FIG. 16A is a side view illustrating overall structure of a vehicle interior structure relating to a twelfth exemplary embodiment of the present invention.
Figure 16B:
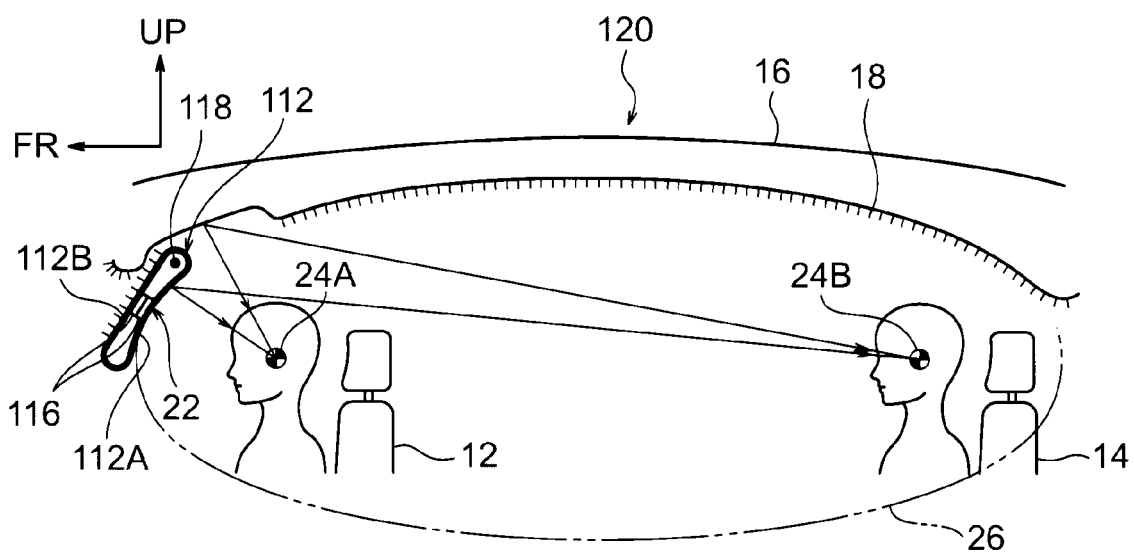
FIG. 16B is a diagram describing operation of the vehicle interior structure illustrated in FIG. 16A.
Figure 16C:
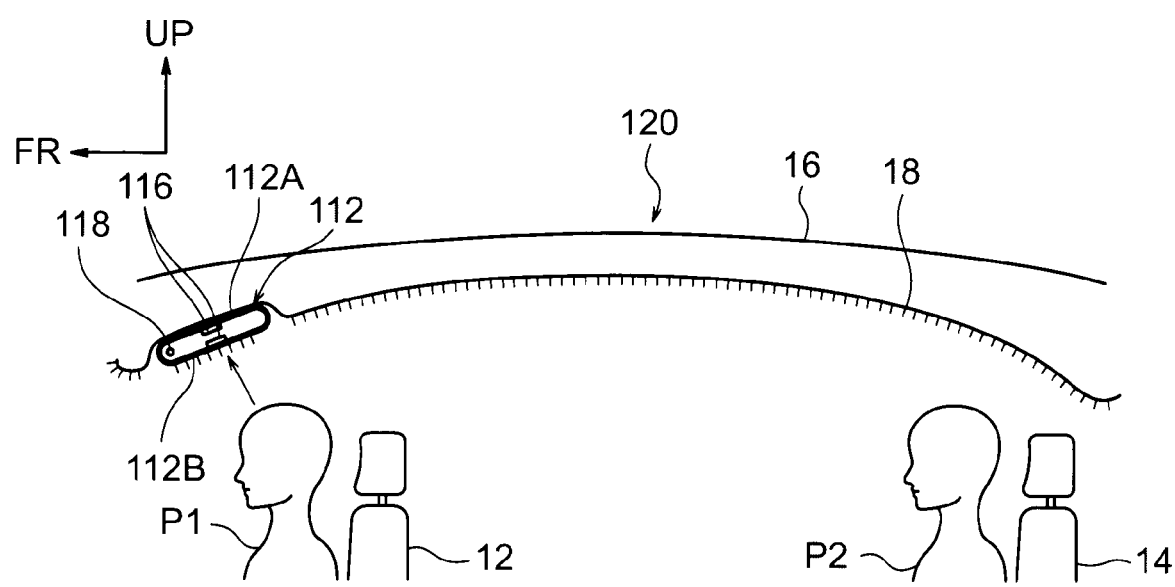
FIG. 16C is a diagram describing operation of the vehicle interior structure illustrated in FIG. 16A.

In FIG. 16A, FIG. 16B and FIG. 16C, overall structure of a vehicle interior structure 120 relating to the twelfth exemplary embodiment of the present invention is illustrated in side view.

In the vehicle interior structure 120 relating to the twelfth exemplary embodiment of the present invention, a sun visor 112 (corresponding to the vehicle member of the present invention) is provided in the above-described vehicle interior structure 110 relating to the eleventh exemplary embodiment of the present invention, instead of the belt-type ceiling member 92 and the motor 102.

That is, at the sun visor 112, one face is a reflecting surface 112A and the other face is an absorbing surface 112B.

The reflecting surface 112A is set to a first deformation state that constitutes the sound-reflecting communication unit 22 when the rear face of the reflecting surface 112A of the sun visor 112 is mated with the rear face of the absorbing surface 112B by planar fasteners 116 (corresponding to the deforming unit and the mating unit of the present invention), as illustrated in FIG. 16B, and a second deformation state that constitutes a flat shape when the state of mating of the planar fasteners 116 is released, as illustrated in FIG. 16A and FIG. 16C.

The sun visor 112 is turnably supported at the ceiling region of the vehicle interior, via a turning axle portion 118 (corresponding to the switching unit and a turning support portion of the present invention), and is capable of attaining a deployed position in which the reflecting surface 112A faces the heads of the occupants P1 and P2, as illustrated in FIG. 16A and FIG. 16B, and a stowed position in which the absorbing surface 112B faces the heads of the occupants P1 and P2, as illustrated in FIG. 16B.

According to the vehicle interior structure 120 relating to the twelfth exemplary embodiment of the present invention, the following characteristic operations and effects are accomplished.

That is, according to the vehicle interior structure 120 relating to the twelfth exemplary embodiment of the present invention, the sun visor 112 is turned to a deployed position in which the reflecting surface 112A faces the heads of the occupants P1 and P2 (this state of the vehicle interior structure 120 corresponds to the first mode of the present invention), by the occupants P1 and P2 turning the sun visor 112 toward the deployed position with the turning axle portion 118 as a pivot point.

When the rear face of the reflecting surface 112A of the sun visor 112 is mated with the rear face of the absorbing surface 112B by the planar fasteners 116 as illustrated in FIG. 16B, by the occupants P1 and P2 pressing the reflecting surface 112A, the reflecting surface 112A constitutes the sound-reflecting communication unit 22 and forms a shape capable of conveying a sound produced from the occupants P1 and P2 toward the other occupant while reflecting and converging the sound (corresponding to the first deformation state of the present invention).

Therefore, a sound produced from the occupants P1 and P2 may be conveyed while being reflected and converged toward the other occupant by the reflecting surface 112A. Thus, communication between the occupants P1 and P2 sitting on the pair of vehicle seats 12 and 14 may be made easier.

On the other hand, when the occupants P1 and P2 release the mating state of the planar fasteners 116, the reflecting surface 112A separates from the absorbing surface 112B and forms a flat shape (corresponding to the second deformation state of the present invention). Thereafter, by the sun visor 112 being turned toward the stowed position with the turning axle portion 118 as the pivot point, the sun visor 112 is turned to the stowed position at which the absorbing surface 112B faces the heads of the occupants P1 and P2, as illustrated in FIG. 16C (this state of the vehicle interior structure 120 corresponds to the second mode of the present invention).

Therefore, a sound produced from the occupants P1 and P2 may be absorbed by the absorbing surface 112B. Thus, communicability of sounds between the occupants P1 and P2 may be made lower than when the reflecting surface 112A constitutes the sound-reflecting communication unit 22 as illustrated in FIG. 16B, and privacy between the occupants P1 and P2 sitting on the pair of vehicle seats 12 and 14 may be maintained.

Thus, according to the vehicle interior structure 120 relating to the twelfth exemplary embodiment of the present invention, a vehicle interior space that makes communication between the occupants P1 and P2 easier and a vehicle interior space in which privacy between the occupants P1 and P2 may be maintained may both be established. Thus, an amenable vehicle interior space may be realized in accordance with the intentions of the occupants P1 and P2.

In the vehicle interior structure 120 relating to the twelfth exemplary embodiment of the present invention, the driving device 64 of the above-described vehicle interior structure 90 relating to the ninth exemplary embodiment of the present invention may be applied, and the sun visor 112 may be switched between the deployed position as illustrated in FIG. 16A and the stowed position as illustrated in FIG. 16C by the sun visor 112 being automatically turned by the driving device 64 in accordance with the sound production state of the occupants P1 and P2.

In this case, the actuator 58 of the driving device 64 may be added, such that the reflecting surface 112A is pulled in toward the absorbing surface 112B by the actuator 58 and the rear face of the reflecting surface 112A mated with the rear face of the absorbing surface 112B when the sun visor 112 is automatically turned to the deployed position by the driving device 64 in accordance with the sound production state of the occupants P1 and P2.

The invention claimed is:

1. A vehicle interior structure comprising:
    a pair of vehicle seats;
    a sound-reflecting communication unit for conveying a sound produced from occupants sitting, respectively, on the pair of vehicle seats to the other occupant, while reflecting and converging the sound; and
    a switching unit for switching between a first mode, in which a sound produced from one of the occupants is conveyed to the other of the occupants while being reflected and converged by the sound-reflecting communication unit and a sound produced from the other of the occupants is conveyed to the one of the occupants while being reflected and converged by the sound-reflecting communication unit, and a second mode, in which communicability of sounds between the occupants is lower than in the first mode.

2. The vehicle interior structure according to claim 1, wherein the sound-reflecting communication unit is structured to be capable of forming a concave shape along a virtual ellipse, whose focuses are at positions of the heads of the occupants, respectively.

3. The vehicle interior structure according to claim 1, wherein the switching unit is a screen unit that is capable of attaining an exposed state, in which the sound-reflecting communication unit is exposed to the pair of vehicle seats, and a covered state, in which the sound-reflecting communication unit is hidden from the pair of vehicle seats.

4. The vehicle interior structure according to claim 3, wherein the screen unit includes a winding-type cover member that is windable onto a winding member, and the screen unit is set to the exposed state by the winding-type cover member being wound onto the winding member and set to the covered state by the winding-type cover member being deployed from the winding member.

5. The vehicle interior structure according to claim 3, wherein the screen unit includes a sliding-type cover member that is slidable between a stowed position and a deployed position of the vehicle interior, and the screen unit is set to the exposed state by the sliding-type cover member being slid to the stowed position and set to the covered state by the sliding-type cover member being slid to the deployed position.

6. The vehicle interior structure according to claim 3, wherein the screen unit is a plurally divided structure.

7. The vehicle interior structure according to claim 1, wherein the sound-reflecting communication unit is fixedly provided at a vehicle member provided in the vehicle.

8. The vehicle interior structure according to claim 1, wherein the sound-reflecting communication unit is plurally provided in the vehicle.

9. The vehicle interior structure according to claim 1, wherein the switching unit is an alterable body at which the sound-reflecting communication unit is integrally provided and that is capable of attaining a first attitude, with which a sound produced from the occupants is conveyed while being reflected and converged toward the other occupant by the sound-reflecting communication unit, and a second attitude, with which communicability of sounds between the occupants is lower than with the first attitude.

10. The vehicle interior structure according to claim 9, wherein the alterable body includes a sliding body, which is provided with a sliding position thereof in the vehicle being alterable, and the alterable body is switched between the first attitude and the second attitude by the sliding position of the sliding body being altered.

11. The vehicle interior structure according to claim 9, wherein the alterable body includes a displacing body, which is provided with a reflecting surface that constitutes the sound-reflecting communication unit and is provided with a direction of the reflecting surface in the vehicle being alterable, and the alterable body is switched between the first attitude and the second attitude by the displacing body altering the direction of the reflecting surface.

12. The vehicle interior structure according to claim 9, wherein the alterable body includes a deforming body, which is provided with a shape of at least a portion thereof in the vehicle being deformable, and the alterable body is switched between the first attitude and the second attitude by the deforming body altering the shape of the at least a portion.

13. The vehicle interior structure according to claim 9, wherein the alterable body includes a turning body, which is provided with a turn angle thereof in the vehicle being alterable, and the alterable body is switched between the first attitude and the second attitude by the turning body altering the turn angle.

14. The vehicle interior structure according to claim 13, wherein the alterable body is a structure that includes a plurality of the turning body.

15. The vehicle interior structure according to claim 13, wherein the turning body comprises:
    a reflecting surface that constitutes the sound-reflecting communication unit; and
    an absorbing surface capable of absorbing a sound produced from the occupants.

16. The vehicle interior structure according to claim 1, wherein the sound-reflecting communication unit is provided at a ceiling region in the vehicle.

17. A vehicle interior structure comprising:
    a pair of vehicle seats;
    a sound-reflecting communication unit for conveying a sound produced from occupants sitting, respectively, on the pair of vehicle seats toward the other occupant, while reflecting and converging the sound; and a vehicle member provided in the vehicle, the vehicle member including:

a reflecting surface that constitutes the sound-reflecting communication unit and is deformable to a first deformation state, in which a sound produced from one of the occupants can be conveyed to the other of the occupants while being reflected and converged by the sound-reflecting communication unit and a sound produced from the other of the occupants can be conveyed to the one of the occupants while being reflected and converged by the sound-reflecting communication unit, and a second deformation state, in which communicability of sounds between the occupants is lower than in the first deformation state;

an absorbing surface capable of absorbing a sound produced from the occupants;

a deforming unit for deforming the reflecting surface from the second deformation state to the first deformation state; and a switching unit for switching between a first mode, in which the reflecting surface faces the heads of the occupants, and a second mode, in which the absorbing surface faces the heads of the occupants.

18. The vehicle interior structure according to claim 17, wherein the reflecting surface and the absorbing surface are provided at an endless belt, the deforming unit is a mating unit for causing a rear face of the reflecting surface of the endless belt to mate with a rear face of the absorbing surface and causing the reflecting surface to deform from the second deformation state to the first deformation state, and the switching unit is a turning unit for causing the endless belt to turn so as to switch between the first mode and the second mode.

19. The vehicle interior structure according to claim 17, wherein the reflecting surface and the absorbing surface are provided at one face and another face of the vehicle member, the deforming unit is a mating unit for causing a rear face of the reflecting surface of the vehicle member to mate with a rear face of the absorbing surface and causing the reflecting surface to deform from the second deformation state to the first deformation state, and the switching unit is a turning support unit that supports the vehicle member to be turnable in the vehicle so as to switch between the first mode and the second mode.

20. The vehicle interior structure according to claim 1, further comprising:

an occupant state detection unit that detects a state of the occupants;

a switching driving unit that drives the switching unit for switching between the first mode and the second mode; and a switching control unit that controls the switching driving unit on the basis of a detection result from the occupant state detection unit.

21. A vehicle interior structure comprising:

a pair of vehicle seats;

a sound-reflecting communication unit for conveying a sound produced from occupants sitting, respectively, on the pair of vehicle seats toward the other occupant, while reflecting and converging the sound;

an alteration unit for altering at least one of a position and a shape of the sound-reflecting communication unit;

an occupant state detection unit that detects a state of the occupants;

an alteration driving unit for driving the alteration unit; and an alteration control unit that controls the alteration driving unit on the basis of a detection result from the occupant state detection unit.

* * * * *